US009367958B2

(12) United States Patent
Hibbard

(10) Patent No.: US 9,367,958 B2
(45) Date of Patent: Jun. 14, 2016

(54) METHOD AND APPARATUS FOR CORRECTION OF ERRORS IN SURFACES

(71) Applicant: IMPAC MEDICAL SYSTEMS, INC., Sunnyvale, CA (US)

(72) Inventor: Lyndon S. Hibbard, St. Louis, MO (US)

(73) Assignee: IMPAC MEDICAL SYSTEMS, INC., Sunnyvale, CA (US)

( * ) Notice: Subject to any disclaimer, the term of this patent is extended or adjusted under 35 U.S.C. 154(b) by 0 days.

(21) Appl. No.: 14/489,547

(22) Filed: Sep. 18, 2014

(65) Prior Publication Data
US 2015/0036901 A1 Feb. 5, 2015

Related U.S. Application Data

(62) Division of application No. 13/195,771, filed on Aug. 1, 2011, now Pat. No. 8,867,806.

(51) Int. Cl.
*G06T 17/30* (2006.01)
*G06T 19/20* (2011.01)

(52) U.S. Cl.
CPC .............. *G06T 17/30* (2013.01); *G06T 19/20* (2013.01); *G06T 2210/41* (2013.01); *G06T 2219/2021* (2013.01)

(58) Field of Classification Search
None
See application file for complete search history.

(56) References Cited

U.S. PATENT DOCUMENTS

| | | |
|---|---|---|
| 5,859,891 A | 1/1999 | Hibbard |
| 6,075,538 A | 6/2000 | Shu et al. |
| 6,112,109 A | 8/2000 | D'Urso |
| 6,142,019 A | 11/2000 | Venchiarutti et al. |
| 6,259,943 B1 | 7/2001 | Cosman et al. |
| 6,262,739 B1 | 7/2001 | Migdal et al. |
| 6,343,936 B1 | 2/2002 | Kaufman et al. |
| 6,606,091 B2 | 8/2003 | Liang et al. |
| 6,683,933 B2 | 1/2004 | Saito et al. |
| 6,947,584 B1 | 9/2005 | Avila et al. |
| 7,010,164 B2 | 3/2006 | Weese et al. |
| 7,110,583 B2 | 9/2006 | Yamauchi |
| 7,167,172 B2 | 1/2007 | Kaus et al. |
| 7,333,644 B2 | 2/2008 | Jerebko et al. |
| 7,428,334 B2 | 9/2008 | Schoisswohl et al. |
| 7,471,815 B2 | 12/2008 | Hong et al. |
| 7,620,224 B2 | 11/2009 | Matsumoto |
| 8,098,909 B2 | 1/2012 | Hibbard et al. |
| 2004/0091143 A1* | 5/2004 | Hu ..................... G06T 7/0085 382/154 |
| 2005/0089214 A1 | 4/2005 | Rubbert et al. |
| 2005/0168461 A1 | 8/2005 | Acosta et al. |

(Continued)

OTHER PUBLICATIONS

Adelson et al., "Pyramid Methods in Image Processing", RCA Engineer, Nov./Dec. 1984, pp. 33-41, vol. 29-6.

(Continued)

*Primary Examiner* — Jon Chang
(74) *Attorney, Agent, or Firm* — Finnegan, Henderson, Farabow, Garrett & Dunner, LLP

(57) ABSTRACT

Methods and systems are disclosed for correcting segmentation errors in pre-existing contours and surfaces. Techniques are disclosed for receiving one or more edit contours from a user, identifying pre-existing data points that should be eliminated, and generating a new corrected surface. Embodiments disclosed herein relate to using received edit contours to generate a set of points on a pre-existing surface, and applying a proximity test to eliminate pre-existing constraint points that are undesirable.

20 Claims, 44 Drawing Sheets

(56) References Cited

U.S. PATENT DOCUMENTS

| | | |
|---|---|---|
| 2005/0231530 A1 | 10/2005 | Liang et al. |
| 2005/0276455 A1 | 12/2005 | Fidrich et al. |
| 2006/0147114 A1 | 7/2006 | Kaus et al. |
| 2006/0149511 A1 | 7/2006 | Kaus et al. |
| 2006/0159322 A1 | 7/2006 | Rinck et al. |
| 2006/0159341 A1 | 7/2006 | Pekar et al. |
| 2006/0177133 A1 | 8/2006 | Kee |
| 2006/0193510 A1* | 8/2006 | Matsumoto ............ G06T 15/06 382/154 |
| 2006/0204040 A1 | 9/2006 | Freeman et al. |
| 2006/0256114 A1 | 11/2006 | Nielsen et al. |
| 2007/0014462 A1 | 1/2007 | Rousson et al. |
| 2007/0041639 A1 | 2/2007 | Von Berg et al. |
| 2007/0092115 A1 | 4/2007 | Usher et al. |
| 2007/0167699 A1 | 7/2007 | Lathuiliere et al. |
| 2008/0225044 A1 | 9/2008 | Huang et al. |
| 2008/0310716 A1 | 12/2008 | Jolly et al. |
| 2009/0016612 A1 | 1/2009 | Lobregt et al. |
| 2009/0060299 A1 | 3/2009 | Hibbard et al. |
| 2009/0190809 A1 | 7/2009 | Han et al. |
| 2010/0134517 A1 | 6/2010 | Saikaly et al. |
| 2011/0019890 A1* | 1/2011 | Oikawa ................. A61B 6/466 382/131 |
| 2011/0200241 A1 | 8/2011 | Roy et al. |
| 2012/0057768 A1 | 3/2012 | Hibbard et al. |
| 2012/0057769 A1 | 3/2012 | Hibbard et al. |

OTHER PUBLICATIONS

Anderson et al., "LAPACK User's Guide", Third Edition, SIAM—Society for Industrial and Applied Mathematics, 1999, Philadelphia.

Barrett et al., "Interactive Live-Wire Boundary Extraction", Medical Image Analysis, 1, 331-341, 1997.

Bertalmio et al., "Morphing Active Countours", IEEE Trans. Patt. Anal. Machine Intel!., 2000, pp. 733-737, vol. 22.

Bloomenthal, "An Implicit Surface Polygonizer", Graphics Gems IV, P Heckbert, Ed., Academic Press, New York, 1994.

Bookstein, "Principal Warps: Thin-Plate Splines and the Decomposition of Deformations", IEEE Transactions on Pattern Analysis and Machine Intelligence, Jun. 1989, pp. 567-585, vol. 11, No. 6.

Botsch et al., "On Linear Variational Surface Deformation Methods", IEEE Transactions on Visualization and Computer Graphics, 2008, pp. 213-230, vol. 14, No. 1.

Burnett et al., "A Deformable-Model Approach to Semi-Automatic Segmentation of CT Images Demonstrated by Application to the Spinal Canal", Med. Phys., Feb. 2004, pp. 251-263, vol. 31 (2).

Carr et al., "Reconstruction and Representation of 30 Objects with Radial Basis Functions", Proceedings of SIGGRAPH 01, pp. 67-76,2001.

Carr et al .. "Surface Interpolation with Radial Basis Functions for Medical Imaging", IEEE Transactions on Medical Imaging, 16. 96-107, 1997.

Cover et al., "Elements of Information Theory", Chapter 2, 1991, Wiley, New York, 33 pages.

Cover et al., "Elements of Information Theory", Chapter 8, 1991, Wiley, New York. 17 pages D.

Cruz et al., "A sketch on Sketch-Based Interfaces and Modeling", Graphics, Patterns and Images Tutorials, $23^{rd}$ SIBGRAPI Conference, 2010, pp. 22-33.

Davis et al., "Automatic Segmentation of Intra-Treatment CT Images for Adaptive Radiation Therapy of the Prostate". presented at 8th Int. Conf. MICCAJ 2005, Palm Springs, CA. pp. 442-450.

De Berg et al., "Computational Geometry: Algorithms and Applications", 1997, Chapter 5, Springer-Verlag, New York.

DeBoor, "A Practical Guide to Splines", Springer, New York, 2001.

Dice's coeffieient, Wikipedia, 1945.

Digital Imaging and Communications in Medicine (DICOM). http://medical.nema.org/.

Dinh et al., "Reconstructing Surfaces by Volumetric Regularization Using Radial Basis Functions", IEEE Transactions on Pattern Analysis and Machine Intelligence, Oct. 2002, pp. 1358-1371, vol. 24, No. 10.

Dinh et al., "Texture Transfer During Shape Transformation", ACM Transactions on Graphics, 24,289-310, 2005.

DoCarmo, "Differential Geometry of Curves and Surfaces", Prentice Hall, New Jersey, 1976.

Duchon, "Splines Minimizing Rotation-Invariant SBMI-NORMS in Soboley Spaces", 1977, Universite Scientifique et Medicale Laboratoire de Mathematiques Appliques, Grenoble France.

Falcao et al., "An Ultra-Fast User-Steered Image Segmentation Paradigm: Live Wire on the Fly", IEEE Transactions on Medical Imaging, 19, 55-62, 2000.

Freedman et al., "Active Contours for Tracking Distributions", IEEE Trans. I mag. Proc., Apr. 2004, pp. 518-526, vol. 13 (4).

Gao et al., "A Deformable Image Registration Method to Handle Distended Rectums in Prostate Cancer Radiotherapy", Med. Phys., Sep. 2006, pp. 3304-3312, vol. 33 (9).

Gelas et al., "VariatonalImplicit Surface Meshing", Computers and Graphics, 2009, pp. 312-320, vol. 33.

Gering et al., "An Integrated Visualization System for Surgical Planning and Guidance using Image Fusion and InterventionalImaging", Int Conf Med Image Comput Assist Interv, 1999, pp. 809-819, vol. 2.

Gering, "A System for Surgical Planning and Guidance Using Image Fusion and Interventional MR", MS Thesis, MIT, 1999.

Girosi et al., "Priors, Stabilizers and Basis Functions: from regularization to radial, tensor and additive splines", Massachusetts Institute of Technology Artificial Intelligence Laboratory, Jun. 1993, 28 pages.

Golub et al., "Matrix Computations", Third Edition, The Johns Hopkins University Press, Baltimore, 1996.

Han et al., "A Morphing Active Surface Model for Automatic Re-Contouring in 4D Radiotherapy", Proc. of SPIE, 2007, vol. 6512, 9 pages.

Ho et al., "SNAP: A Software Package for User-Guided Geodesic Snake Segmentation", Technical Report, UNC Chapel Hill, Apr. 2003.

Huang et al., "Semi-Automated CT Segmentation Using Optic Flow and Fourier Interpolation Techniques", Computer Methods and Programs in Biomedicine, 84, 124-134, 2006.

Ibanez et al., "The ITK Software Guide" Second Edition, 2005.

Igarashi et al., "Smooth Meshes for Sketch-based Freeform Modeling" In ACM Symposium on Interactive 3D Graphics, (ACM 13D'03}, pp. 139-142, 2003.

Igarashi et al., "Teddy: A Sketching Interface for 3D Freeform Design", Proceedings of SIGGRAPH 1999, 409-416.

Ijiri et al., "Seamless Integration of Initial Sketching and Subsequent Detail Editing in Flower Modeling", Eurographics 2006, 25, 617-624, 2006.

International Search Report and Written Opinion for PCT/US2012/048938 dated Oct. 16, 2012.

Jackowski et al., "A Computer-Aided Design System for Refinement of Segmentation Errors", MICCAI 2005, LNCS 3750, pp. 717-724.

Jain et al., "Deformable Template Models: A Review", Signal Proc., 1998, pp. 109-129, vol. 71.

Jain, "Fundamentals of Digital Image Processing", Prentice-Hall, New Jersey, 1989.

Jehan-Besson et al., "Shape Gradients for Histogram Segmentation Using Active Contours", 2003, presented at the 9th IEEE Int. Conf. Comput. Vision, Nice, France, 8 pages.

Kalbe et al., "High-Quality Rendering of Varying Isosurfaces with Cubic Trivariate C1-continuous Splines", ISVC 1, LNCS 5875, 2009, pp. 596-607.

Kalet et al., "The Use of Medical Images in Planning and Delivery of Radiation Therapy", J. Am. Med. Inf. Assoc., Sep./Oct. 1997, pp. 327-339, vol. 4 (5).

Karpenko et al., "Free-Form Sketching with Variational Implicit Surfaces", Computer Graphics Forum, 21, 585-594, 2002.

Karpenko et al., "SmoothSketch: 3D Free-Form Shapes From Complex Sketches", Proceedings of SIGGRAPH 06, pp. 589-598.

Kaus et al., "Automated 3-D PDM Construction From Segmented Images Using Deformable Models", IEEE Transactions on Medical Imaging, Aug. 2003, pp. 1005-1013, vol. 22, No. 8.

Kho et al., "Sketching Mesh Deformations", ACM Symposium on Interactive 3D Graphics and Games, 2005, 8 pages.

(56) References Cited

OTHER PUBLICATIONS

Knoll et al., "Fast and Robust Ray Tracing of GeneralImplicits on the GPU", Scientific Computing and Imaging Institute, University of Utah, Technical Report No. UUSCI-2007-014, 2007, 8 pages.
Leymarie et al., "Tracking Deformable Objects in the Plane Using an Active Contour Model", IEEE Trans. Patt. Anal. Machine Intel!., Jun. 1993, pp. 617-634, vol. 15 (6).
Leventon et al., "Statistical Shape Influence in Geodesic Active Contours", IEEE Conference on Computer Vision and Pattern Recognition, 2000, pp. 1316-1323.
Lipson et al., "Conceptual Design and Analysis by Sketching", Journal of AI in Design and Manufacturing, 14, 391-401, 2000.
Lorenson et al., "Marching Cubes: A High Resolution 3D Surface Construction Algorithm", Computer Graphics, Jul. 1987, pp. 163-169, vol. 21 (4).
Lu et al., "Automatic Re-Contouring in 40 Radiotherapy", Phys. Med. Bioi., 2006, pp. 1077-1099, vol. 51.
Lu et al., "Fast Free-Form Deformable Registration Via Calculus of Variations", Phys. Med. Bioi., 2004, pp. 3067-3087, vol. 49.
Marker et al., "Contour-Based Surface Reconstruction Using Implicit Curve Fitting, and Distance Field Filtering and Interpolation", The Eurographics Association, 2006, 9 pages.
Nealen et al., "A Sketch-Based Interface for Detail-Preserving Mesh Editing", Proceedings of ACM SIGGRAPH 2005, 6 pages, vol. 24, No. 3.
Notice of Allowance for U.S. Appl. No. 12/022,929 dated May 8, 2012.
Office Action for U.S. Appl. No. 13/295,494 dated Sep. 13, 2012.
Office Action for U.S. Appl. No. 13/295,525 dated Nov. 28, 2012.
Osher et al., "Level Set Methods and Dynamic Implicit Surfaces", Chapters 11-13, 2003, Springer-Verlag, New York, NY.
Paragios et al., "Geodesic Active Contours and Level Sets for the Detection and Tracking of Moving Objects", IEEE Trans. Patt. Anal. Machine Intel!., Mar. 2000, pp. 266-280, vol. 22 (3).
Pekar et al., "Automated Model-Based Organ Delineation for Radiotherapy Planning in Prostate Region", Int. J. Radiation Oncology Bioi. Phys., 2004, pp. 973-980, vol. 60 (3).
Pentland et al., "Closed-Form Solutions for Physically Based Shape Modeling and Recognition", IEEE Trans. Patt. Anal. Machine Intel!., Jul. 1991, pp. 715-729, vol. 13 (7).
Piegl et al., "The NURBS Book", Second Edition, Springer, New York, 1997.
Pieper et al., "The NA-MIC Kit: ITK, VTK, Pipelines, Grids and 3D Slicer as an Open Platform for the Medical Image Computing Community", Proceedings of the 3rd IEEE International Symposium on Biomedical Imaging: From Nano to Macro 2006, pp. 698-701, vol. 1.
Pohl et al., "A Bayesian model for joint segmentation and registration", NeuroImage, 2006, pp. 228-239, vol. 31.
Press et al., "Numerical Recipes inC", Second Edition, Cambridge University Press, 1992.
Rogelj et al., "Symmetric Image Registration", Med. Imag. Anal., 2006, pp. 484-493, vol. 10.
Sapiro, "Geometric Partial Differential Equations and Image Analysis", Chapter 8, 2001, Cambridge University Press.
Sarrut et al., "Simulation of Four-Dimensional CT Images from Deformable Registration Between Inhale and Exhale Breath-Hold CT Scans", Med. Phys., Mar. 2006, pp. 605-617, vol. 33 (3).
Schmidt et al., ShapeShop: Sketch-Based Solid Modeling with Blob Trees, Eurographics Workshop on Sketch-Based Interfaces and Modeling, 2005.
Schroeder et al., "The Visualization Toolkit", 2nd edition, Chapter 5, 1998, Prentice-Hall, Inc.
Sethian, "Level Set Methods and Fast Marching Methods", 2nd ed., 1999, Cambridge University Press, Chapters 1 , 2 & 6, 39 pages.
Singh et al., "Real-Time Ray-Tracing of Implicit Surfaces on the GPU", IEEE Transactions on Visualization and Computer Graphics, 2009, pp. 261-272, vol. 99.
Stefanescu, "Parallel Nonlinear Registration of Medical Images With a Priori Information on Anatomy and Pathology", PhD Thesis. Sophia-Anti polis: University of Nice, 2005, 140 pages.
Strang, "Introduction to Applied Mathematics", 1986, Wellesley, MA: Wellesley-Cambridge Press, pp. 242-262.
Thirion, "Image Matching as a Diffusion Process: An Analog with Maxwell's Demons", Med. !mag. Anal., 1998, pp. 243-260, vol. 2 (3).
Thomas, "Numerical Partial Differential Equations: Finite Difference Methods", Springer, New York, 1995.
Tikhonov et al., "Solutions of Ill-Posed Problems", Introduction-Chapter 2, 1977, John Wiley & Sons.
Tsai et al, "A Shape-Based Approach to the Segmentation of Medical Imagery Using Level Sets", IEEE Transactions on Medical Imaging, Feb. 2003, pp. 137-154, vol. 22, No. 2.
Tsai et al., "An EM algorithm for shape classification based on level sets", Medical Image Analysis, 2005, pp. 491-502, vol. 9.
Turk et al., "Shape Transformation Using Variational Implicit Functions", Proceedings of SIGGRAPH 99, Annual Conference Series, (Los Angeles, California), pp. 335-342, Aug. 1999.
Vemuri et al., "Joint Image Registration and Segmentation", Geometric Level Set Methods in Imaging, Vision, and Graphics, S. Osher and N. Paragios, Editors, 2003, Springer-Verlag, New York, pp. 251-269.
Wahba, "Spline Models for Observational Data", SIAM (Society for Industrial and Applied Mathematics), Philadelphia, PA, 1990.
Wang et al., "Validation of an Accelerated 'Demons' Algorithm for Deformable Image Registration in Radiation Therapy", Phys. Med. Bioi., 2005, pp. 2887-2905, vol. 50.
Wolf et al., "ROPES: a Semiautomated Segmentation Method for Accelerated Analysis of Three-Dimensional Echocardiographic Data", IEEE Transactions on Medical Imaging, 21, 1091-1104,2002.
Xing et al, "Overview of Image-Guided Radiation Therapy", Med. Dosimetry, 2006, pp. 91-112, vol. 31 (2).
Xu et al., "Image Segmentation Using Deformable Models", Handbook of Medical imaging, vol. 2, M. Sonka and J. M. Fitzpatrick, Editors, 2000, SPIE Press, Chapter 3.
Yezzi et al., "A Variational Framework for Integrating Segmentation and Registration Through Active Contours", Med. Imag. Anal., 2003, pp. 171-185, vol. 7.
Yoo, "Anatomic Modeling from Unstructured Samples Using Variational Implicit Surfaces", Proceedings of Medicine Meets Virtual Reality 2001, 594-600.
Young et al., "Registration-Based Morphing of Active Contours for Segmentation of CT Scans", Mathematical Biosciences and Engineering, Jan. 2005, pp. 79-96, vol. 2 (1).
Yushkevich et al., "User-Guided 3D Active Contour Segmentation of Anatomical Structures: Significantly Improved Efficiency and Reliability" , NeuroImage 31, 1116-1128, 2006.
Zagrodsky et al., "Registration-Assisted Segmentation of Real-Time 3-D Echocardiographic Data Using Deformable Models", IEEE Trans. Med. Imag., Sep. 2005, pp. 1089-1099, vol. 24 (9).
Zeleznik et al., "SKETCH: An Interface for Sketching 3D Scenes", Proceedings of SIGGRAPH 96, 163-170, 1996.
Zhong et al., "Object Tracking Using Deformable Templates", IEEE Trans. Patt. Anal. Machine Intel!., May 2000, pp. 544-549, vol. 22 (5).

* cited by examiner

311

311

METHOD AND APPARATUS FOR CORRECTION OF ERRORS IN SURFACES

This application is a divisional application of U.S. application Ser. No. 13/195,771, filed Aug. 1, 2011, the entire content of which is hereby incorporated by reference.

FIELD OF THE INVENTION

The present invention pertains generally to the field of processing medical images, particularly to computer assisted modification of surfaces representative of anatomical structures.

BACKGROUND AND SUMMARY OF THE INVENTION

Various techniques are known in the art for automated contouring and segmentation of computer images as well as generation of three-dimensional surfaces, e.g. from two-dimensional contour data. Typical objects of interest in medical images include organs such as bladder, prostate, kidneys, and many other types of anatomical objects as is well known in the art. Objects of interest in cellular imaging include, for example, cell nucleus, organelles, etc. It will be understood that the techniques disclosed herein are equally applicable to any type of object of interest.

Exemplary techniques for generating and manipulating three-dimensional surfaces are disclosed in U.S. application Ser. No. 11/848,624, entitled "Method and Apparatus for Efficient Three-Dimensional Contouring of Medical Images", filed Aug. 31, 2007, and published as U.S. Patent Pub. No. 2009-0060299, and U.S. application Ser. No. 12/022,929, entitled "Method and Apparatus for Efficient Automated Re-Contouring of Four-Dimensional Medical Imagery Using Surface Displacement Fields", filed Jan. 30, 2008, and published as U.S. Patent Pub. No. 2009-0190809, the entire disclosures of each of which are incorporated herein by reference.

Software utilities for generating and manipulating 2D contours and 3D surfaces include 3D Slicer (Pieper et al., 2006; Gering et al., 1999) and ITK-SNAP (Yushkevich et 75 al., 2006), and software packages including VTK software system available from Kitware, Inc. of Clifton Park, N.Y. (See Schroeder et al., The Visualization Toolkit, 4th Ed., Kitware, 2006), and Insight Registration and Segmentation ToolKit (ITK, Ibanez et al., 2005), the entire disclosures of each of which are incorporated herein by reference.

Three-dimensional (3D) surfaces are typically generated based on contour data corresponding to many two-dimensional (2D) images. Generally speaking, a contour is a set of points that identifies or delineates a portion or segment of an image that corresponds to an object in the image. Each contour separates or segments an object from the remainder of the image. Contours may be generated by computer vision (e.g. by edge detection software), manually (e.g. by a person using a marker to draw edges on an image), or any combination of the two (e.g. by a person using computer-assisted segmentation or contouring software).

An exemplary system may be configured to (1) capture many images of an object of interest from many different viewpoints, (2) perform an automated segmentation process to automatically generate contours that define the object of interest, and (3) generate a 3D surface representative of the object of interest. A 3D surface may be represented by one or more radial basis functions, each centered on a constraint point. Thus, a 3D surface may be defined by a plurality of constraint points.

As an arbitrary example, a system may be configured to capture 100 2D images in each of the coronal, sagittal, and transverse planes, for a total of 300 two-dimensional images. The exemplary system could then automatically generate contours for each of the 2D images using a segmentation process (such as the exemplary segmentation processes disclosed in the cross-referenced applications), and then use the generated contours to create a 3D object representative of the anatomical structure.

Automated or computer generated contouring and segmentation of medical images frequently results in erroneous contours that do not accurately reflect the shape of the anatomical structure shown in the underlying images. Errors may be more prevalent where an original image set suffers from low contrast, noise, or nonstationary intensities.

Furthermore, manual contouring and computer-assisted contouring based on user-input may also result in contours having mistakes that would benefit from further manual editing. For example, a more experienced user may wish to modify erroneous contours created by a less experienced user.

Errors in contours fall into two general categories: under-segmentation and over-segmentation. With under-segmentation, only a first portion of an object (e.g. anatomical structure) is correctly identified by the contour, while a second portion of the object is incorrectly excluded. In the case of over-segmentation, extraneous portions of an image are incorrectly identified by the contour as part of the object (e.g. anatomical structure).

Thus, it is desirable to provide a user with the ability to manually edit contours to correct various mistakes and errors in an existing contour. With existing contour editing software, a user supplies a 2D "edit contour" for an object of interest (e.g. anatomical structure) for one or more 2D images. The user-supplied edit contour data is indicative of an edited or corrected contour for the object.

Due to the large number of underlying images and contours that may be involved, it is preferable that contour editing software not require the user to create edit contours for all of the underlying images. It is preferable to allow the user to modify only a subset of the underlying 2D contours (e.g. based on user selection of the viewpoint or viewpoints in which the error is most clearly visible), and to provide software for correcting a 3D surface shape representative of an object based on the received edit contours.

The inventor has identified various problems that arise in the process of modifying contours and surfaces. For example, one problem is the difficulty inherent in deciding which pre-existing constraint points for a pre-existing surface should be eliminated. For example, when an object of interest has been under-segmented, the pre-existing surface will be too small. The received edit contours will thus correspond to a new 3D surface that is larger than the pre-existing surface. Thus, an interface between the pre-existing 3D surface and the new 3D surface may exist, such as a concave deformity. In the case of over-segmentation, the interface may be a convex deformity. It will be understood that any combination of under-segmentation and over-segmentation may occur for a given object of interest. E.g., one portion of an object may be over-segmented, while another portion is under-segmented, as is known in the art. Accordingly, multiple edit contours may be received for a single object in a single image, each edit contour corresponding to a different segmentation error.

Embodiments disclosed herein are directed to correcting errors in one or more pre-existing contour, pre-existing surface, and/or pre-existing set of constraint points. The pre-existing contour(s), pre-existing constraint points, and pre-existing surface(s) may have been automatically or manually generated. Embodiments disclosed herein are directed to modifying a pre-existing three-dimensional surface and/or set of pre-existing constraint points based on one or more received edit contours. Embodiments disclosed herein are directed to creating a new three-dimensional surface and/or set of constraint points based on one or more received edit contours. Embodiments are disclosed for correcting both under-segmentation and over-segmentation.

Embodiments disclosed herein use data corresponding to the received edit contours to selectively eliminate pre-existing constraint points on a pre-existing 3D surface.

These and other features and advantages of the present invention are disclosed herein and will be understood by those having ordinary skill in the art upon review of the description and figures hereinafter.

DETAILED DESCRIPTION OF THE PREFERRED EMBODIMENTS

Figure 1A:
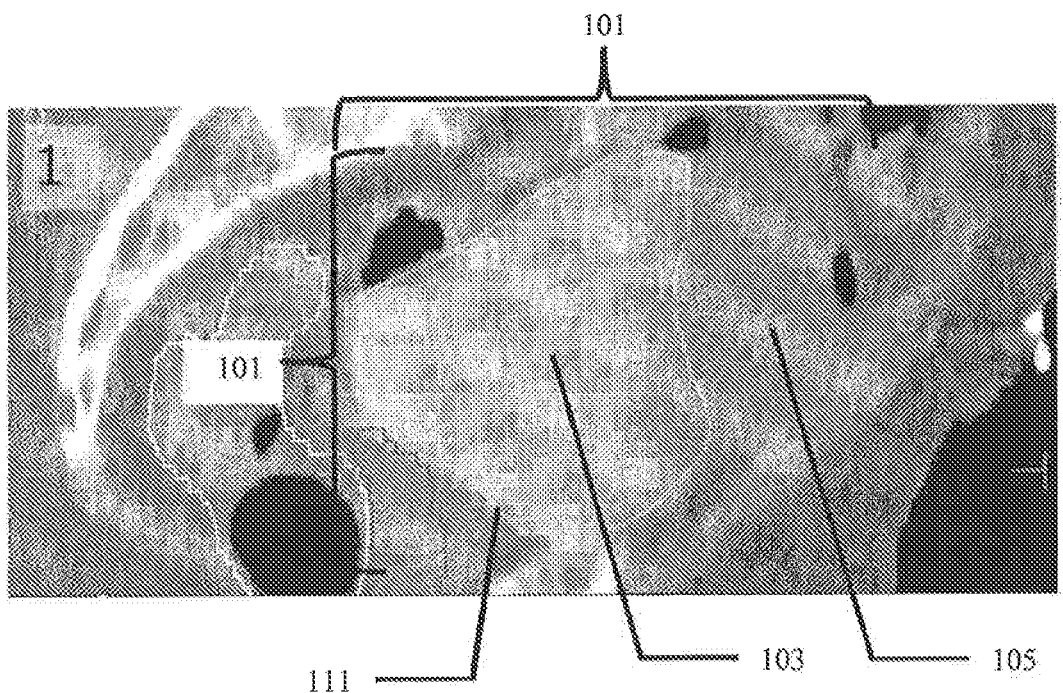
FIG. 1(A) depicts a two-dimensional image of a bladder with a pre-existing segmentation contour having an under-segmentation error.

Comprehensible displays of patient anatomy based on medical imaging are helpful in many areas, such as radio-therapy planning. Interactive contouring of patient anatomy can be a large part of the planning cost. While auto-segmentation programs now coming into use can produce results that approximate the true anatomy, these results must be reviewed by trained personnel and often require modification. The inventor has identified a need in the art to accurately and efficiently reconstruct 3D objects by combining 2D contours from the most informative views, and edit existing structures by reshaping the structure's surface based on user input. The inventor discloses various embodiments for providing these features. Both goals may be achieved by interpolating over new and existing structure elements to produce reconstructions that are smooth and continuous like the physical anatomy.

Surface Representations

A three-dimensional (3D) surface is one of the most compact and versatile ways to represent anatomical structures. The structure surface is sampled during contouring, and resampled when contours are edited. Recent progress in computer science has produced new methods to create and manipulate surfaces efficiently, in two broad areas depending on the surface definition. Explicit surfaces are meshes with vertices and polygon edges connecting the vertices. Implicit surfaces (or "implicit function surfaces") are defined by spline-like basis functions (e.g. radial basis functions (RBF)) and control or constraint points.

The explicit mesh is a familiar graphics object and is the representation used by programs like 3D Slicer (Pieper et al., 2006; Gering et al., 1999) and ITK-SNAP (Yushkevich et al., 2006) to perform anatomy display, registration, and some segmentation functions. These two programs (and many others) are built in part on open source software including the Visualization Toolkit (VTK, Schroeder, et al., 2006) and the insight Registration and Segmentation ToolKit (ITK, Ibanez et al., 2005). The Marching Cubes algorithm (Lorensen and Cline, 1987) used to create surface meshes is an essential technology for these programs.

Deformation of explicit meshes depends on tightly constrained, coordinated relocations of vertices that preserve the mesh polygon geometry. Laplacian methods (reviewed in Botsch and Sorkine) enable mesh deformations that ascend in complexity from local linear mesh translations up to general deformations that preserve local surface differential properties. Deformations responding to motions of defined "handles" on the mesh produce efficient and detailed animation (Nealen, et al., 2005; Kho and Garland, 2005). A medical application of explicit deformation for semiautomated segmentation is given in (Pekar et al., 2004; Kaus et al., 2003) in which the mesh smoothness and geometry are constrained by quadratic penalties on deviation from a model and balanced with mesh vertices' attraction to image edges. In most cases, the deforming mesh has a fixed set of vertices and fixed polygonal connectivity, and only needs to be re-rendered to observe a change.

Implicit surfaces may be defined by the locations of constraint points and weighted sums of basis functions that interpolate the surface between constraint points. The surface shape can be changed simply by relocating or replacing some of the constraint points. Turk and O'Brien (1999) popularized what they termed variational implicit surfaces by demonstrating several useful properties: the implicit surfaces are smooth and continuous, one can approach real-time surface generation and editing for small numbers of constraints (<2000), and one 3-D shape can continuously blend into another. Carr et al. (2001) proposed a computational method to accelerate implicit surface generation, and earlier (Carr et al., 1997) demonstrated a medical application of implicit surfaces to the design of cranial implants. Karpenko et al. (2002) demonstrated an interactive graphics program that created complex 3-D shapes using implicit surfaces generated and modified by user gestures. Jackowski and Goshtasby (2005) demonstrated an implicit representation of anatomy which the user could edit a surface by moving the constraints. More recent work has concentrated on hardware acceleration of implicit rendering (Knoll et al., 2007; Singh and Narayanan, 2010) and alternative implicit surface polygonization algorithms (Gelas, et al., 2009; Kalbe, et al., 2009), that purport to improve on the classic polygonization method of Bloomenthal (1994).

Implicit Functions as Shape Media

Implicit functions have several important applications in imaging science, including PDE-driven (Partial Differential Equations) image restoration, deformable registration, and segmentation (Sethian, 1999; Sapiro, 2001; Osher & Fedkiw, 2003). Leventon et al. (2000) pointed out that the average shape of multiple implicit function-objects could be obtained by averaging the registered signed distance functions (a kind of implicit function) and distributions of shapes could be represented by the principal components of sets of implicit functions. This result was elaborated in joint registration-segmentation several medical applications (Tsai et al 2003; Tsai et al., 2005; Pohl et al., 2006).

Implicit surfaces may be represented as the zero level sets of a signed distance function $f(x)=h$ where $f$ is a real function taking a real value h at the general point $x=(x,y,z)$, where $h=0$ at the surface, $h>0$ inside the surface and $h<0$ outside the surface. Signed distance functions are implicits where h is the distance from a general point x to the nearest $\hat{x}$ for which $f(\hat{x})=0$, with the sign convention above. The goal is to reconstruct a surface $f()$ from N points $\{x_1, x_2, \ldots, x_N\}$ with corresponding $\{h_1, h_2, \ldots, h_N\}$ where $h=f(x_i)$. However, such a problem does not have a unique solution. A constraint may be applied to convert this ill-posed problem to one with a solution. Data smoothness is the usual constraint, and regularization theory (Tihkonov and Arsenin (1977), Girosi et al (1993)) provides such solutions by the variational minimization of functionals of the form $$H[f] = \sum_{i=1}^{N} (f(x_i) - h_i)^2 + \lambda S[f] \qquad \text{EQ (1)}$$

where $\lambda \geq 0$ is the regularization parameter that establishes the tradeoff between the error term $(f(x_i)-h_i)^2$ and the smoothness functional $S[f]$ that penalizes functions $f$ that change direction rapidly (a smooth surface is preferred over a wrinkled one). It has been shown (Duchon, 1977; Wahba, 1990; Girosi et al., 1993) that $H[f]$ is minimized when $f$ is expressed as the weighted sum of radial basis functions (RBFs)—positive, radially symmetric, real functions. Two important examples are given below.

$$\varphi(r) = \begin{cases} \|r\|^{2m-d} \ln\|r\|, & \text{if } 2m > d \text{ and } d \text{ is even} \\ \|r\|^{2m-d}, & \text{otherwise} \end{cases} \qquad \text{EQ (2)}$$

where $\|r\|=\|x-c_j\|$ is the Euclidean distance from x to the radial function center $c_j$, m is the smoothness parameter and d is the dimensionality of the object on which interpolation is done. In one embodiment, the form $\|r\|^2 \ln\|r\|$ (m=2, d=2) is used, which corresponds to the well-known 2D thin plate spline (Booksrein, 1978). In another embodiment, the triharmonic RBF $\|r\|^3$ (m=3, d=3) (Turk & O'Brien, 1999) is used.

Implicit Surface Interpolation

Interpolation of general points $x=(x,y,z)^T$ across a 3D surface is computed by $$s(x) = P(x) + \sum_{j=1}^{n} w_j \varphi(\|x - c_j\|^3) \qquad \text{EQ (3)}$$

where interpolant s(x) approximates $f(x)$ by summing over the RBFs $\phi(\|x-c_j\|^3)$ weighted by the $w_j$. The points $c_j=(x_j,y_j,z_j)$ are constraint points on which the RBFs are centered. The RBFs, in conjunction with the scalars $h_j=f(c_j)$, determine the shape of the surface.

To make shape specification more reliable, two sets of constraints may be used. (Turk and O'Brien, 1999; Carr et al., 2001). A first set is on the implicit function at the zero level, $f(c_j)=h_j=0$, and a second set equal in number to the first set and each located at the end of an inward-pointing normal of length one from a constraint in the first set, $f(c_{k\neq j})=h_k=1$. The first term is a linear polynomial $P(x_j)=p_0+p_1x_j+p_2y_j*p_3z_j$ that locates the surface relative to an arbitrary origin. Since the surface function is linear in the $\phi$, the $w_j$ can be determined by least squares solution of the linear system $$\begin{pmatrix} A & C \\ C^T & 0 \end{pmatrix} \begin{pmatrix} w \\ p \end{pmatrix} = B \begin{pmatrix} w \\ p \end{pmatrix} = \begin{pmatrix} h \\ 0 \end{pmatrix} \qquad \text{EQ (4)}$$

where A is an n×n matrix with $A_{i,j}=\phi(\|c_i-c_j\|^3)$, C is an n×4 matrix whose i-th row contains (1 $x_i$ $y_i$ $z_i$), vector $p=(p_0,p_1,p_2,p_3)^T$ is the origin basis, vector $w=(w_1, \ldots, w_n)^T$ contains the weights, and vector $h=(h_1, \ldots, h_n)^T$ contains the known implicit function values at the constraint locations. Matrix B has dimensions n+4×n+4. Because the $\phi(x)=\phi(\|x-c\|^3)$ are montonically increasing, submatrix A is dense and the solution $$B^{-1} \begin{pmatrix} h \\ 0 \end{pmatrix} = \begin{pmatrix} w \\ p \end{pmatrix} \qquad \text{EQ (5)}$$

can in principle be obtained by factorization using LU decomposition (Golub and Van Loan, 1996). Unfortunately, the solution is ill-conditioned because matrix B has a zero diagonal. Dinh et al. (2003) suggest making the diagonal more positive by adding the n×n diagonal matrix Λ

$$\begin{pmatrix} A + \Lambda & C \\ C^T & 0 \end{pmatrix} \begin{pmatrix} w \\ p \end{pmatrix} = B \begin{pmatrix} w \\ p \end{pmatrix} = \begin{pmatrix} h \\ 0 \end{pmatrix} \qquad \text{EQ (6)}$$

where the diagonal elements $\Lambda_{ii}$ may be individually set for each constraint. One can use the values, $$\Lambda_{ii} = \begin{cases} 0.001, & f(c_i) = 0 \\ 1.0, & f(c_i) = +1 \end{cases} \qquad \text{EQ (7)}$$

for constraints lying either on the implicit surface ($f(c_i)=0$) or on a normal inside the surface ($f(c_i)=+1$). This greatly improves the stability of the $B^{-1}$ solution.

After solving for the $d_j$ and the $p_j$ in Equation (6), the implicit function in (3) can be evaluated to determine the zero-th level points of $f$. The method of Bloomenthal (1994) may be used to enumerate mesh vertices and polygons.

Efficient Constraint Allocation

The main performance limitation is the number of constraints n. Matrix factorization (LU decomposition using Gaussian elimination) has a complexity of about $O(2n^3/3)$ and the subsequent surface meshing requires m determinations of s(x) each requiring an n-length inner product (Equation (3)) where the number of surface search computations m depends on the area of the surface and the sampling rate.

Figure 3A:
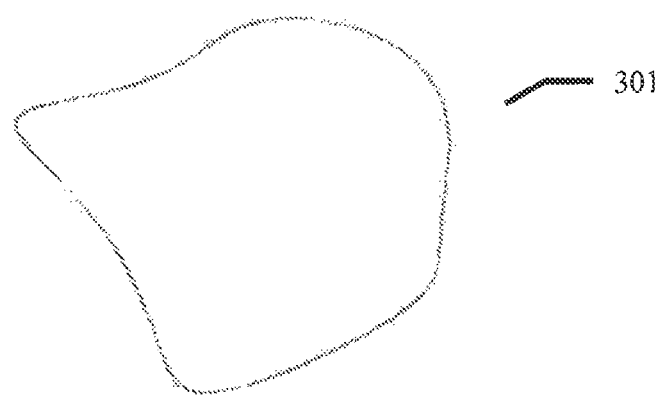
FIGS. 3(A)-3(C) depict an exemplary edit contour.
Figure 3B:
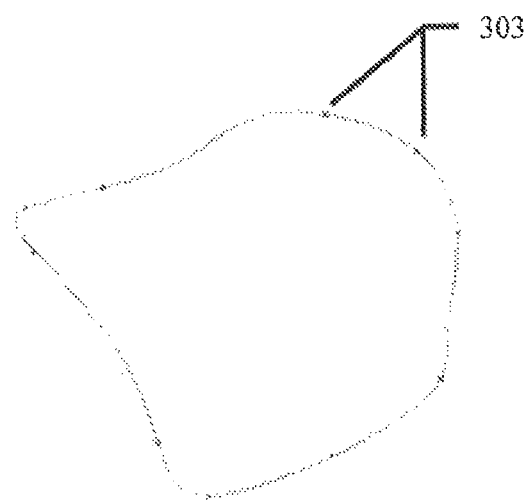
Figure 3C:
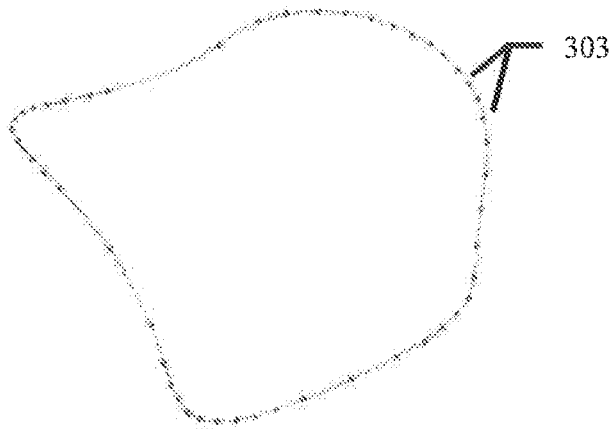

In addition to hardware and software parallelization, the computational burden can also be reduced by minimizing the number of constraints to those that sample the contour only at the most shape-informative points, where the second and higher derivatives are changing most rapidly. DeBoor (2001) described a method to optimally place points along a curve to represent its shape. The idea is to divide the total curvature into m equal parts, concentrating them where the curvature is greatest. A planar closed curve C(x,y,z) of length L can be parameterized by distance u along the curve such that C(x,y,z)=C(x(u),y(u),z(u))=C(u) where $0 \le u \le L$ and $C(0)=C(L)$. The DeBoor curvature (bending energy) is the k-th root of absolute value of the k-th derivative of the curve at point u, $$|D^k C(u)|^{1/k} = \left| \frac{d^k}{du^k} C(u) \right|^{1/k} \qquad \text{EQ (8)}$$

where $D^k C(u)$ is the derivative operator. The total curvature K $$K = \int_0^L |D^k C(u)|^{1/k} du \qquad \text{EQ (9)}$$

divided into m equal parts $$\int_{v_j}^{v_{j+1}} |D^k C(u)|^{1/k} du = \frac{K}{m} \qquad \text{EQ (10)}$$

enables one to solve for sample points $v_j$, j=1, ..., m. These $v_j$ are the surface constraints derived from contour C(u). A set of m corresponding normal constraints are then created to complete the implicit shape definition so the total number of constraints is n=2m. The number c must be specified to the program before the $v_j$ can be determined. FIGS. 3(A)-3(C) demonstrate contour resampling for a closed contour (FIG. 3(A)), for m=10 sample points (FIG. 3(B)) and for m=50 points (FIG. 3(C)). The points cluster in intervals along the contour where the curvature is greatest. This is described in detail in above-referenced and incorporated U.S. application Ser. No. 11/848,624.

Implicit Surface Reconstruction

Implicit surface reconstruction accuracy is related to the number of constraints n (Eq. (3)) and their distribution in space. That distribution can be controlled by three parameters: 1) the number of constraints used to resample each contour, 2) the number of contours arrayed in various planes spanning the volume of the structure, and 3) a distance limit that prevents constraints being placed closer than a threshold distance from one another. This distance limit confers robustness on reconstructions in situations where manually drawn contours in orthogonal planes do not exactly intersect.

Figure 14A:
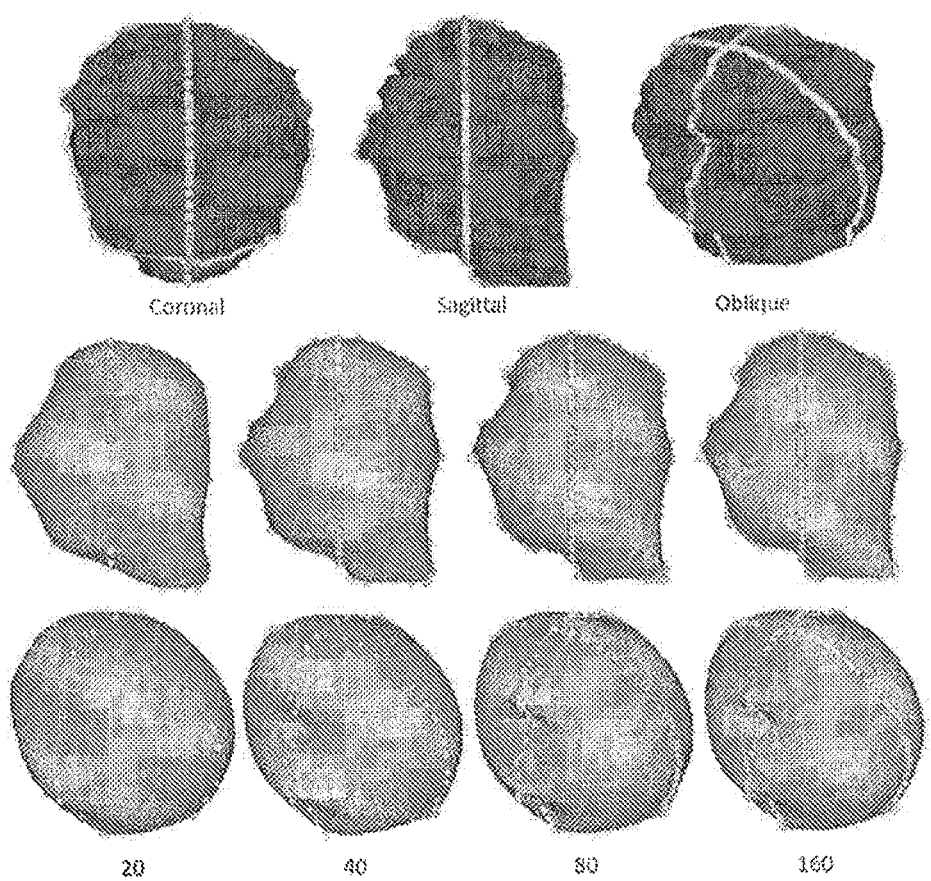
FIGS. 14(A)-14(C) depict 3D surfaces based on constraint points.
Figure 14B:
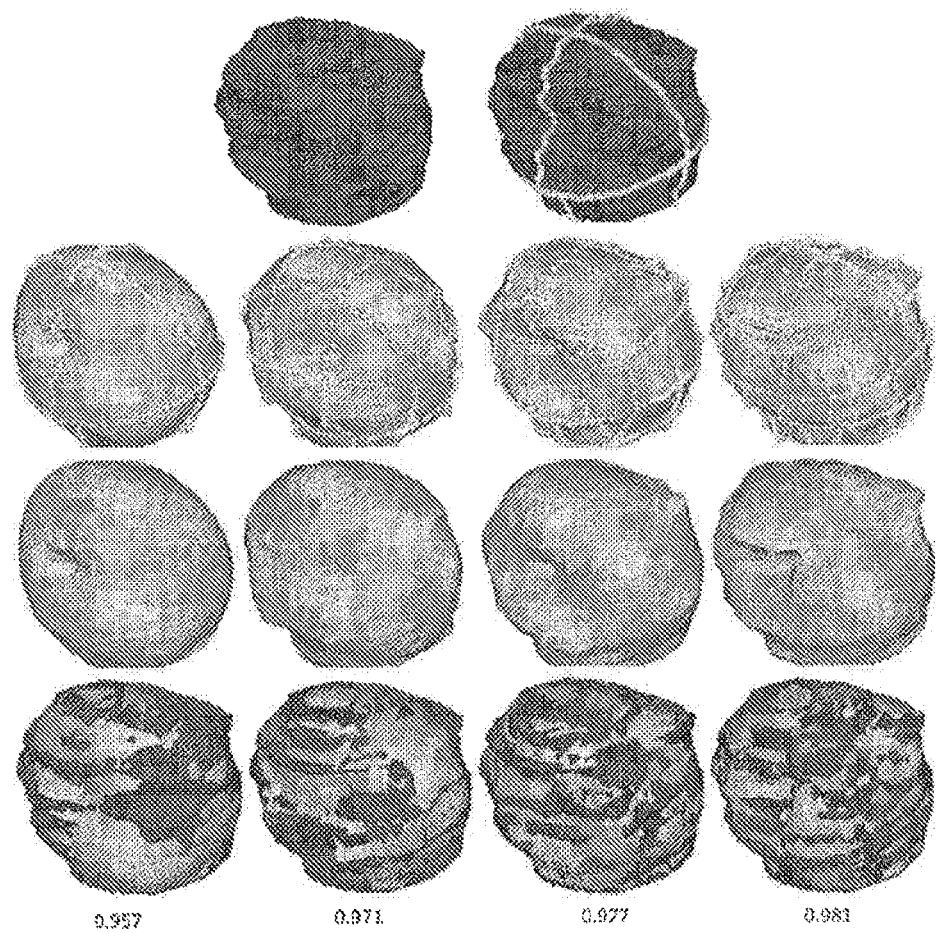
Figure 14C:
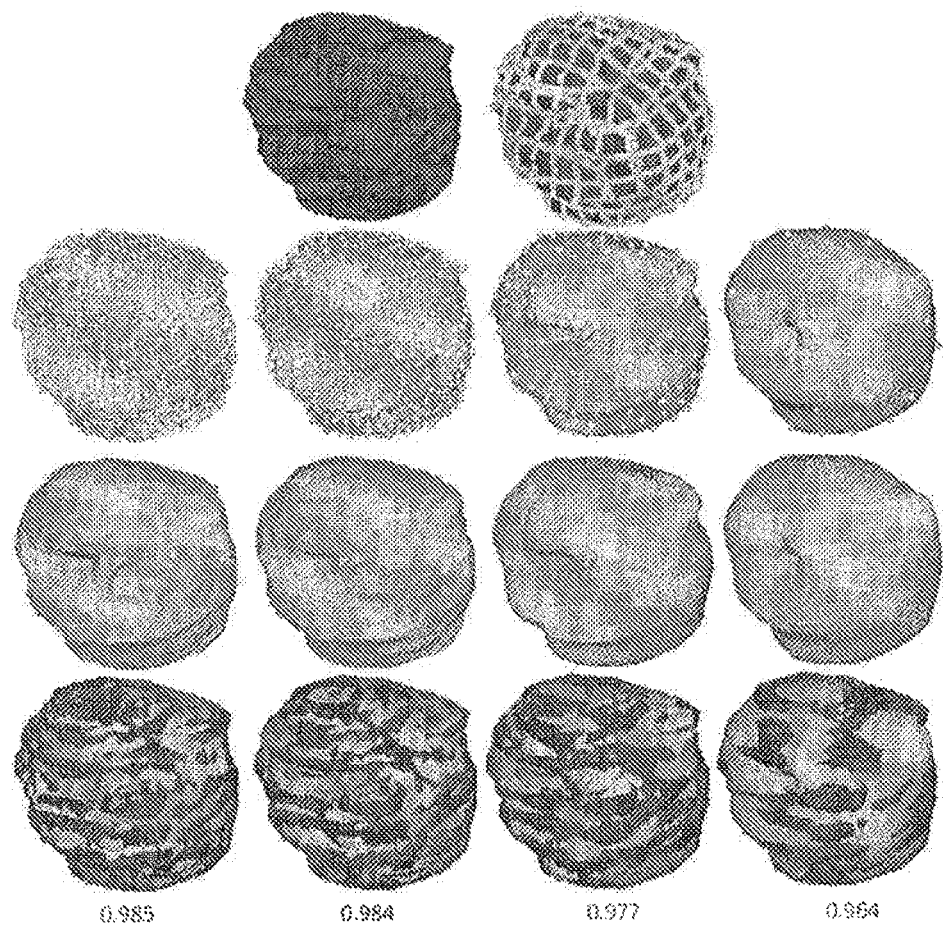

The goal in reconstruction is to efficiently sample a surface by using as few constraints as necessary to obtain the desired accuracy. FIGS. 14(A)-(C) show the effects of varying these three parameters on reconstruction accuracy.

To study the behavior of implicit surface reconstruction, simulated contouring and reconstruction was performed by resampling of expert-contoured prostate, bladder and rectum from 103 cases, intersecting each expert structure with transverse/sagittal/coronal (T/S/C) planes and assigning constraints to locations on these planes' intersection polygons, using the efficient allocation method described above. With these constraints, one can solve the linear problem in Equation 6, and reconstruct the surface with Equation 3. The reconstructed surface can then be compared with the expert surface by overlap measures. For example, the Dice coefficient (Dice, 1945) may be used, defined as the overlap of two volumes A and B:

$$D=2(A \cap B)/(A \cup B)$$

A second measure of overlap is the mean distance between nearest vertices in the two surfaces, denoted as the mean vertex distance (MVD).

FIG. 14(A), shows the effect of varying the first parameter—number of constraints per contour—on an expert-drawn prostate (in three views, Row 1) with central sagittal and coronal contours (contour points shown as small spheres on the surface) obtained by intersecting the surface with those views' planes. Rows 2 and 3 show the implicit surfaces reconstructed from these two contours in sagittal and oblique views, respectively. The number of constraint points per contour is indicated at the bottom of FIG. 14(A), i.e. 20, 40, 80, 160. The constraints are located non-uniformly along the contour paths based on DeBoor curvature as described above.

Spatial detail increases with increasing density of constraints along the contours. The deep invagination on the anterior coronal face of the prostate (left side of the oblique views) appears in the lowest resolution (20 constraints/contour) reconstruction and becomes more sharply defined with increased sampling rates. A smaller indentation under the coronal contour (right side of oblique view) at 160 and 80 has disappeared at 40. The squared inferior aspect of the prostate seen in the sagittal view is most sharply defined at 160 and diminishes steadily to 20.

FIG. 14(B) demonstrates the effect of the second parameter—number and arrangement of intersection planes—on the expert prostate from FIG. 14(A) with single T, S, and C sample contours. Row 1 shows the expert prostate (left) with inscribed contours at the central T (transverse), S (sagittal), and C (coronal) planes (right). Row 2 shows reconstructions of the prostate using 1, 2, 3, and 4, respectively, T, S, and C sample contours with the constraints indicated, all resampled at 160 constraints/contour (from left to right, 1T1S1C, 2T2S2C, 3T3S3C, 4T4S4C). Spacing for the planar contours is set to $x_i=x_{min}+[(i-1)(x_{max}-x_{min})/n]$, i=1, ..., n, and similarly for y and z. Row 3 shows the reconstructed surfaces without the constraints. Row 4 shows the superposed reconstructed and expert surfaces, with the Dice coefficients indicated below. The number of constraints per contour was equal to 160, and the inter-constraint distance was 1.0 mm throughout all these reconstructions. Using the code, nTnSnC, n=1, 2, 3, 4 to represent the array of sample planes, the deep invagination in the anterior coronal face of the prostate is sampled directly by the n=1, 3, 4 reconstructions and the sharp outcrop on the expert prostate at the upper right aspect of the oblique view is well-captured by the n=3, 4 reconstructions. This indicates that the reconstruction fidelity is improved by sampling the expert structure at those places where the shape has sharp details, or where the local surface curvature is changing rapidly.

FIG. 14(C) demonstrates the effect of the third parameter—inter-constraint distance limit—on reconstruction accuracy. Again, using the expert prostate from FIGS. 14(A)-(B) (Row 1, left), the surface was sampled by eight planes in each of the T, S, and C views (Row 1, right). Reconstructions holding the first two parameters constant are shown in the following rows in which the inter-constraint distance limit is 1.0 mm, 2.0 mm, 4.0 mm, and 8.0 mm, for columns 1 through 4, respectively. Row 4 shows the superposed reconstructed and expert surfaces, with the Dice coefficients indicated below.

Implicit Surface Modification

The shape of an implicit surface may be modified by changing the locations or number of the constraint points that define the implicit surface. An original or pre-existing set of constraint points is represented by $C=\{c_1, c_2, \ldots\}$ and edit contour constraints may be represented as $E=\{e_1, e_2, \ldots\}$. As described above, the inventor discloses that it is preferable to eliminate some of the C constraints. Equation 6 may be recalculated using the reduced set of C constraints and the E constraints as described in detail below.

Error Correction Techniques

FIGS. 1(A)-1(D) show the workflow of surface editing implemented in an exemplary commercial contouring program (Elekta CMS Focal4D®). FIG. 1(A) depicts a two-dimensional image of a bladder 101 taken in the sagittal plane, and a corresponding pre-existing contour 111. Bladder 101 was injected with a contrast agent prior to imaging, but the contrast agent did not fill the entire volume of bladder 101, resulting in a relatively bright portion 103 and a relatively dark portion 105 of bladder 101. As can be seen, pre-existing contour 111 has identified only the bright portion 103 of bladder 101, and incorrectly excluded dark portion 105. Thus, pre-existing contour 111 is an example of an erroneously under-segmented contour. Contour 111 is referred to as "pre-existing" because it is a contour that is generated prior to, and supplied as an input to, the modification process described herein (e.g. at step 201).

Figure 1B:
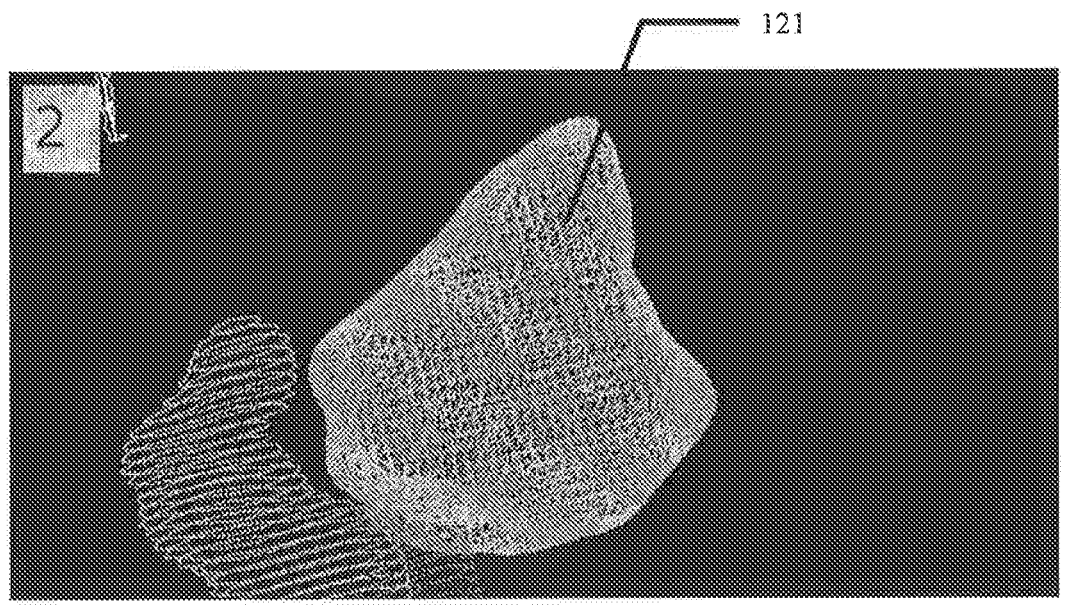
FIG. 1(B) depicts a pre-existing three-dimensional surface based on the under-segmented bladder of FIG. 1(A).

FIG. 1(B) depicts a perspective view of an exemplary 3D surface 121 generated based on pre-existing contours of bladder 101, such as contour 111. As can be seen, 3D surface 121 reflects the erroneously under-segmented bladder and erroneous exclusion of portion 105. FIG. 1(B) shows the surface of the bladder reconstructed from the constraints $c_i=(x_i,y_i,z_i)$ described above.

Figure 1C:
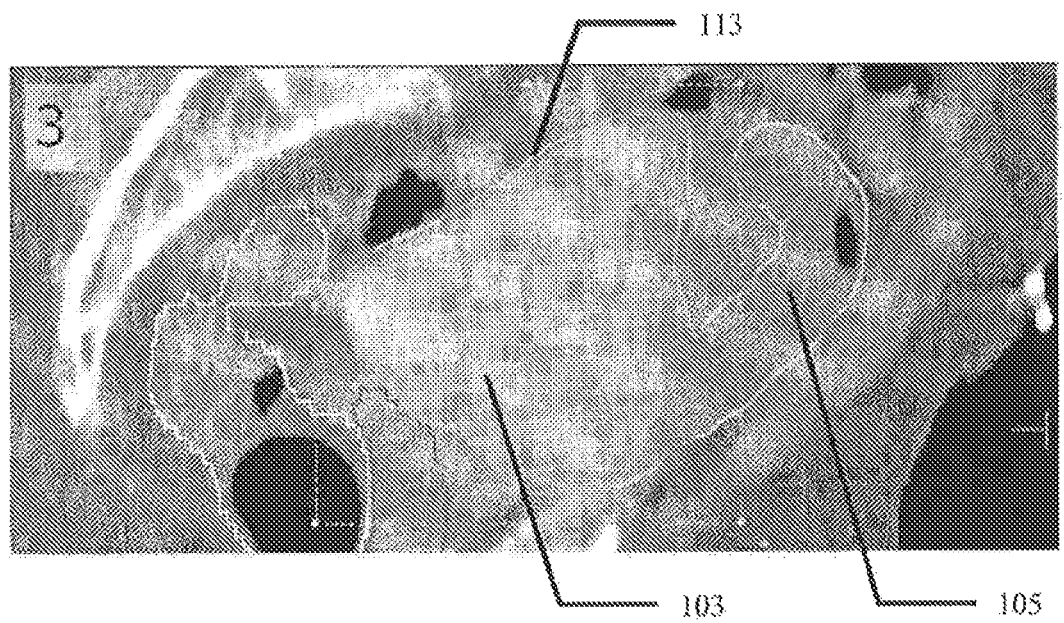
FIGS. 1(C)-1(D) depict a computer-assisted method for creating edit contours.

FIG. 1(C) depicts an intermediate step in the process of generating an edit contour using a smoothing tool to modify the bladder outline contour. Edit contour 113 corresponds to a modified version of pre-existing contour 111 wherein contour 111 has been modified by a user to create contour 113. For example, edit contour 113 may be entered by a user using contour editing software, such as commercial contouring software like that in the Elekta CMS Focal4D® contouring and display program.

Figure 1D:
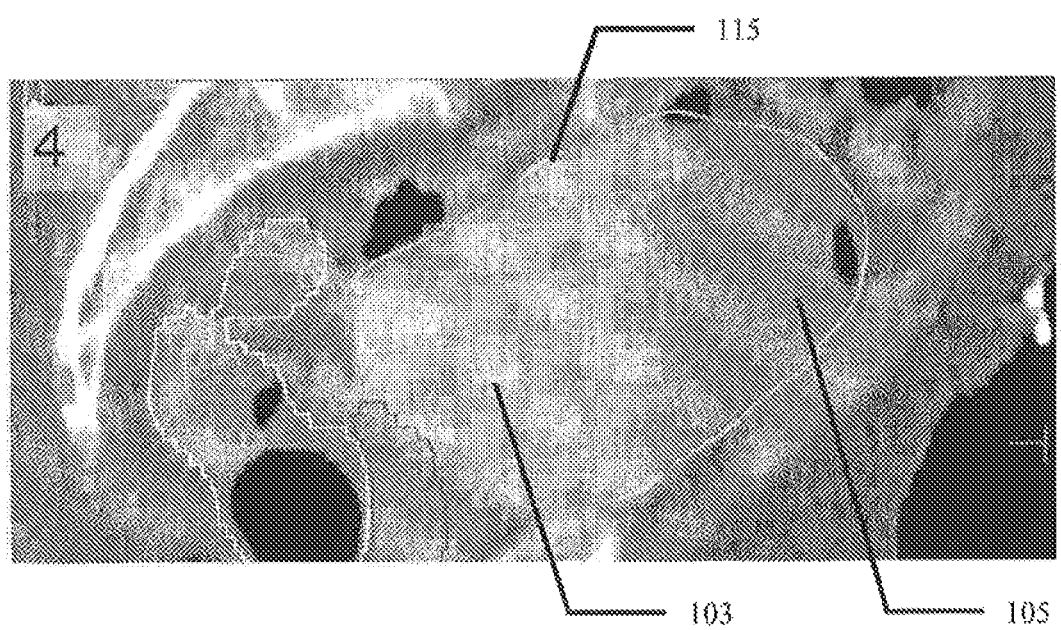

FIG. 1(D) depicts a finalized edit contour 115. As can be seen, edit contour 115 accurately includes both the bright portion 103 and dark portion 105 of bladder 101. Thus, the edit contour 115 is a correction relative to the under-segmented pre-existing contour ill.

Figure 1E:
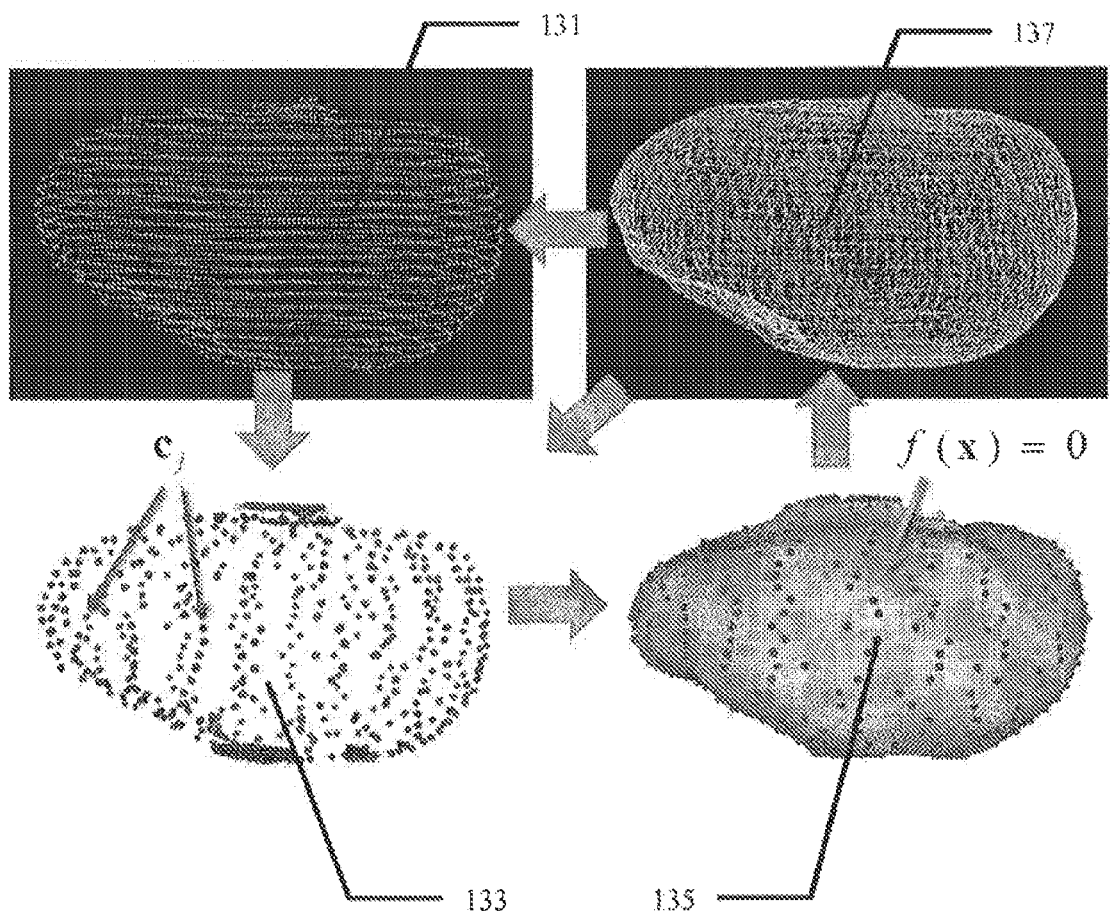
FIG. 1(E) depicts various graphical representations of 3D surfaces and 2D contours.

FIG. 1(E) depicts a plurality of 2D contours 131 (such as contour 111 or contour 115), a set of constraint points Cj 133 generated from the contours 131, a 3D surface 135 generated by feeding the constraint points 133 to a radial basis function calculation, and a set of vertices and edges comprising mesh 137 corresponding to the 3D surface. Processes for generating a set of constraint points from a set of contours, generating a 3D surface from a set of constraint points with corresponding radial basis functions, and generating a mesh (e.g. set of vertices and edges) from a 3D surface are known in the art and do not require explanation.

Once an acceptable 3D surface is generated corresponding to an object of interest, the 3D surface may be used to re-contour the object in one or more 2D images including the object (or a portion of the object). For example, mesh 137 may be used to generate a new set of contours (e.g. contours 131), as is known in the art. A 3D surface (such as mesh 137) may be used to generate one or more contours (e.g. 2D contours) by computing the intersection of the surface (e.g. vertices of a mesh) with one or more planes.

Figure 1F:
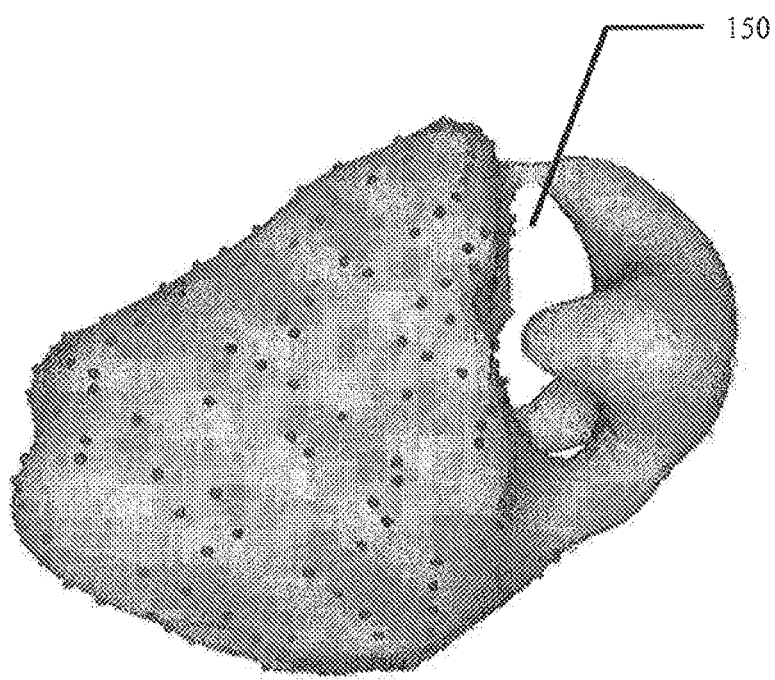
FIG. 1(F) depicts a three-dimensional surface having an undesirable deformity at the interface between two surfaces, where this deformity can be reduced or substantially eliminated by embodiments disclosed herein.

FIG. 1(F) depicts an exemplary surface that is generated without eliminating any of the pre-existing constraint points from the pre-existing surface based on the erroneous pre-existing contour(s). Only a subset of the erroneous pre-existing contours (e.g. contour 111) have been corrected with new/modified edit contours (e.g. edit contour 115). As can be seen, the newly generated surface comprises a deformity 150 caused by pre-existing constraint points on the old surface. In other words, an erroneous interface exists between the pre-existing surface (e.g. pre-existing surface 121) and a hypothetical correct surface that does not include the pre-existing, erroneous constraint points. Embodiments of the invention are directed to reducing this deformity and erroneous interface by reducing or eliminating pre-existing erroneous constraint points.

Figure 2A:
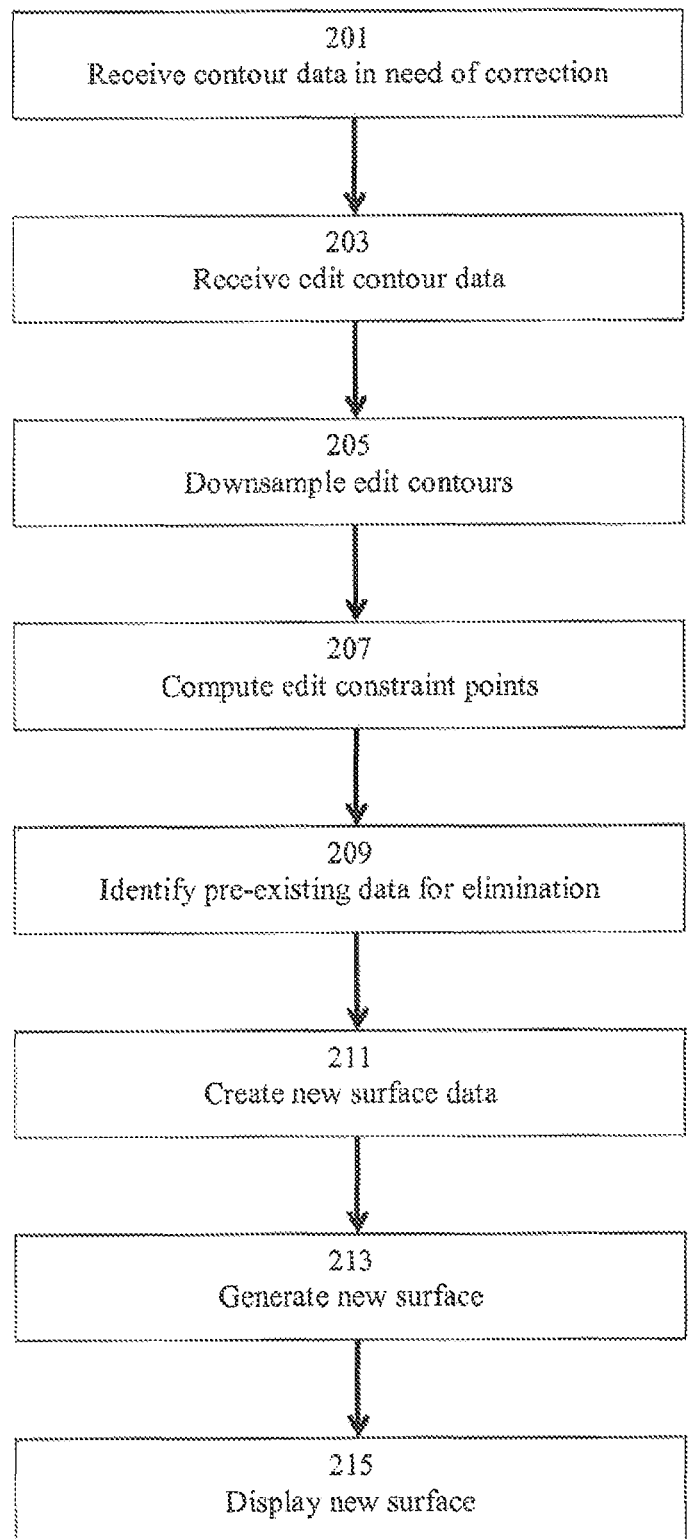
FIGS. 2(A)-2(D) depict flow diagrams according to exemplary embodiments.

FIG. 2(A) depicts a flow diagram for a process according to an exemplary embodiment. At step 201 the process receives data corresponding to a plurality of contours in need of correction, such as erroneous pre-existing contour 111. The received contour data may have been generated by the same processor that is used to execute the modification process of FIG. 2(A), or a different processor.

At step 203, the process receives data corresponding to one or more new edit contours, such as edit contour 115. The received edit contours may comprise two-dimensional contours from one, two, three, or more different planes (e.g. coronal, sagittal, transverse, oblique). The process may receive user input indicative of edit contour data at step 203. It should be noted that edit contours may be received in any plane, not limited to the standard coronal, sagittal, and transverse planes.

At step 205, each received edit contour is down-sampled. Exemplary graphical depictions of down-sampling are shown in FIGS. 3(A)-3(C). Various down-sampling algorithms may be employed. For example, the system may be configured to down-sample by selecting edit contour points at fixed intervals, for example, every fifth point of the edit contour. In another exemplary embodiment, the system is configured to employ a down-sampling technique that identifies shape-salient points from the edit contour, e.g., using a DeBoor equal energy theorem as described above and disclosed in above-referenced and incorporated U.S. application Ser. No. 11/848,624.

Figure 3D:
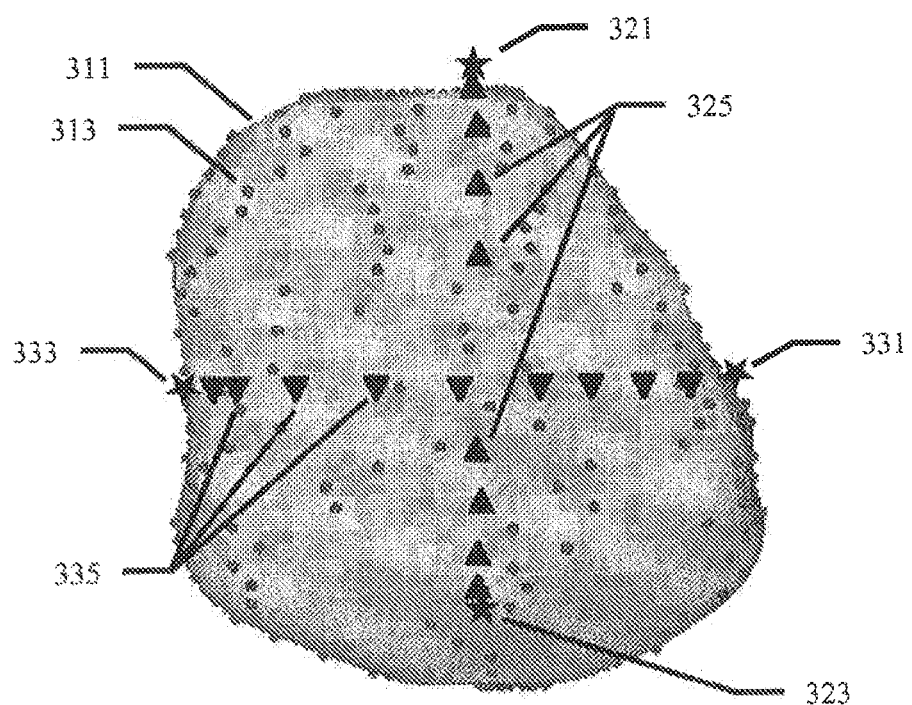
FIGS. 3(D)-3(E) depict exemplary surfaces and constraint points.
Figure 3E:
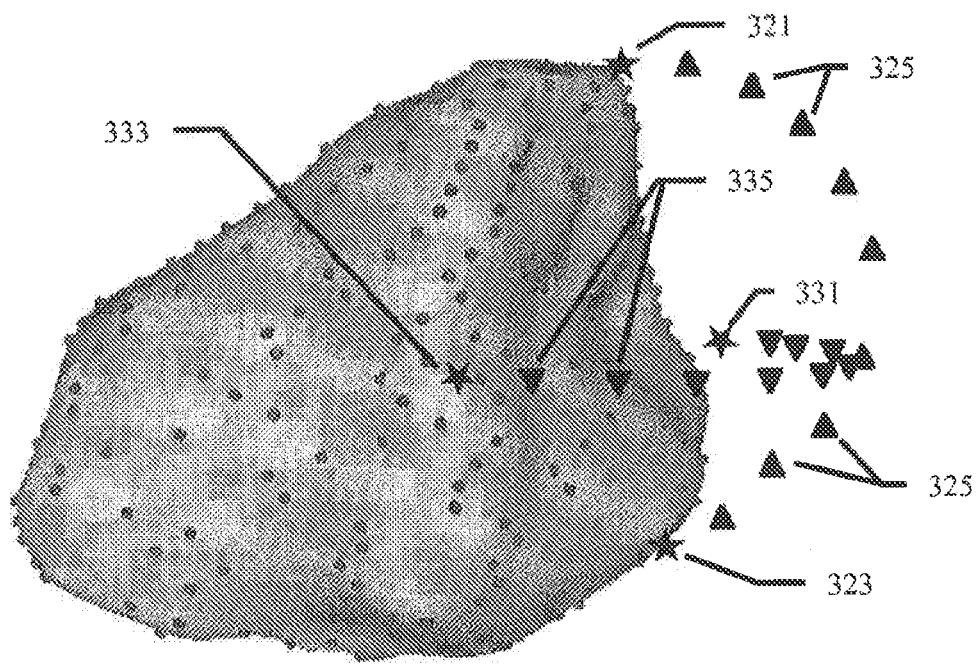

At step 207, the system computes new edit constraint points based on the received edit contour data. These new edit constraint points will be used later to create the new corrected surface, as described in detail below. A graphical depiction of an exemplary set of edit constraint points based on two edit contours is shown in FIGS. 3(D) and 3(E). FIG. 3(D) shows a coronal view of pre-existing surface 311. FIG. 3(E) shows an oblique perspective view of pre-existing surface 311. The exemplary surface shown in FIGS. 3(D) and 3(E) continues the example of the erroneously under-segmented bladder from FIGS. 1(A)-1(B). The pre-existing constraint points 313 for the pre-existing surface are shown as circles on the pre-existing surface 311. New edit constraint points are shown as triangles, with the end points shown as stars. In the exemplary embodiment of FIGS. 3(D) and 3(E), two edit contours were received: one in the transverse plane and one in the sagittal plane. New edit constraint points based on the sagittal edit contour comprise end points 321 and 323, depicted by upward pointing stars, and intermediate points 325, depicted by upward pointing triangles, arranged vertically in the figures. New edit constraint points based on the transverse edit contour comprise end points 332 and 333, depicted by downward pointing stars, and intermediate points 335, depicted by downward pointing triangles, arranged horizontally in the figures.

At step 209, the system identifies one or more erroneous pre-existing data items (e.g. constraint points) that should be eliminated. Exemplary embodiments for identification/elimination step 209 are described in detail below with reference to FIGS. 2(B) and 2(C).

At step 211, the system creates corrected surface data for the new, corrected surface. In a preferred embodiment, a new corrected set of constraint points is computed, wherein the new corrected set of constraint points comprises the set of pre-existing constraint points, plus the constraint points generated as a result of the new edit contours, minus the constraint points identified for elimination, as shown in Equation (11).

$$C(\text{correct}) = C(\text{old}) + C(\text{edit}) - C(\text{eliminate}) \qquad EQ(11)$$

At step 213 the system generates a new corrected surface based on the new corrected set of constraint points. Various methods for generating a surface from a set of constraint points are known in the art. See, e.g., Turk and O'Brien, *Shape Transformation Using Variational Implicit Functions* (1999). See also Bloomenthal, (1994).

At step 215 the system displays the new surface. For example, the system may display the new surface on a monitor in real-time as new edit contours are received from user input. Or as another example, the system may generate and display the new surface steps (211 and 213) in response to a user request to re-generate the surface based on edit contours input so far. The system may allow the user to generate a new surface based on a single edit contour, as described below.

It should be noted again that the embodiment shown in FIG. 2(A) is exemplary and it will be apparent that various modifications to the exemplary embodiment of 2(A) are within the scope of the invention. For example, another exemplary embodiment might omit down-sampling step 205 or omit the display step 215. Yet another exemplary embodiment might comprise a software program that only identifies pre-existing surface data for elimination based on received edit contour data, without generating or displaying any surfaces (e.g. such an embodiment may be implemented as a software module within a larger contour-editing software program).

It should also be noted that the modification process (e.g. the process of FIG. 2(A)) may be performed in an iterative fashion. For example, the system may display the generated new surface to the user (e.g. at step 215) along with a prompt asking whether the user is satisfied with the new surface, and if the user would like to provide additional edit contours or adjust other parameters (e.g. proximity threshold discussed below) to further improve on the new surface (e.g. return to step 203).

Figure 2B:
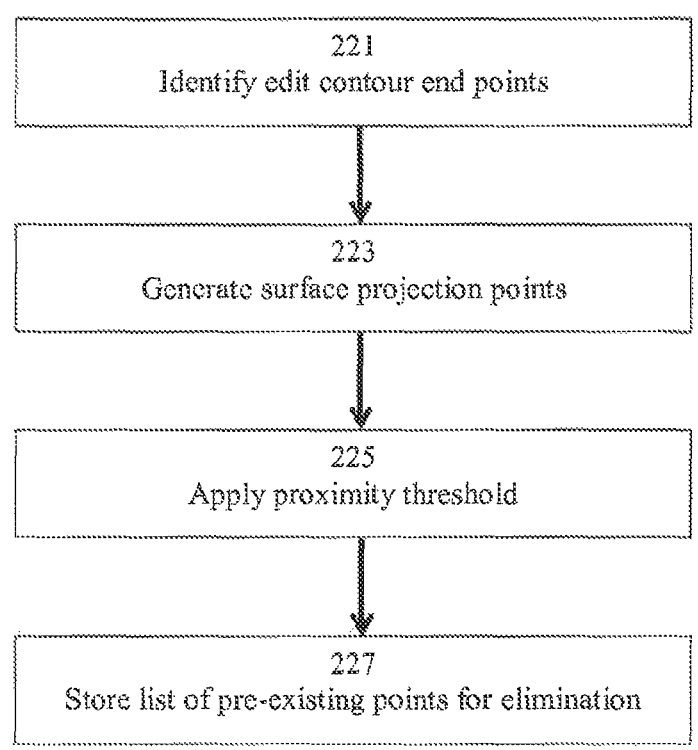

FIG. 2(B) depicts a flow diagram for an exemplary embodiment of identification step 209. The embodiment of FIG. 2(B) is an example of what will be referred to herein as a "surface projection points" approach for identifying pre-existing data for elimination. At step 221 the system identifies the end points of each edit contour. At step 223, the system generates a plurality of surface projection points, on the pre-existing surface, that lie in the plane of each edit contour and between the edit contour endpoints. In other words, the system creates surface projection points on the pre-existing surface based on a projection of the edit contours onto the pre-existing surface.

Figure 4A:
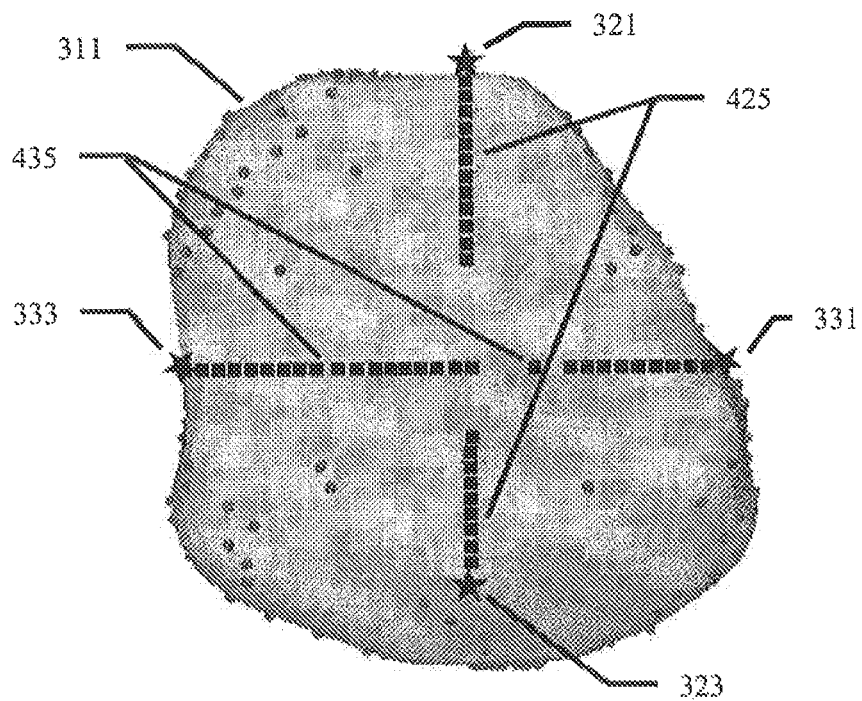
FIGS. 4(A)-4(B) depict exemplary surface projection points.
Figure 4B:
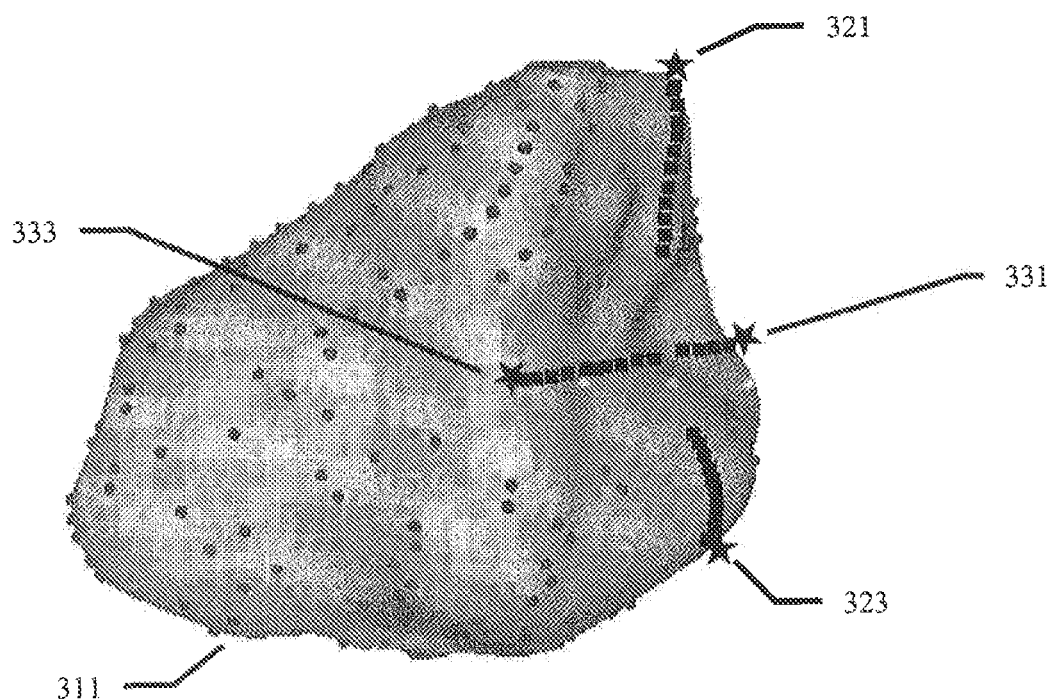

Graphical depictions of exemplary surface projection points 425 and 435 are shown in FIGS. 4(A) and 4(B). Surface projection points 425, depicted by small squares, are created by the projection of the sagittal edit contour onto the pre-existing surface, and are generally arranged in a vertical row in the figures. Surface points 435, depicted by small squares, are created by the projection of the transverse edit contour onto the pre-existing surface, and are generally arranged in a horizontal row in the figures. As can be seen in the oblique view of FIG. 4(B), the projection points 425 and 435 are mapped onto 3D surface 311.

At step 225, the system uses the surface projection points to identify pre-existing surface constraint points for elimination. In an exemplary embodiment, the system applies a proximity threshold test to identify all pre-existing data points that are within a pre-set Euclidean threshold distance from any of the surface points 425 and 435. The pre-set threshold distance effectively defines a 3D "zone of elimination" around each surface point, such that any pre-existing constraint point within the zone will be eliminated.

It should be noted that the proximity threshold test (in the surface projection approach and/or the surface patch approach) may compute a monotonic function of the distance between the two points, and compare the output of the function to the proximity threshold. For example, the system could compute the square of the distance or the logarithm of the distance between the points.

It should further be noted that the proximity threshold value may be input by a user. For example, the system may prompt the user for a proximity threshold at the beginning of the process (e.g. at step 203). In another exemplary embodiment, the system could display a newly generated surface along with a prompt requesting the user to input a proximity threshold value (e.g. at step 215), and the prompt may be operable to adjust the proximity threshold and thereby cause the system to re-generate the new surface based on the received proximity threshold value. It should be understood that various user prompts for requesting a proximity threshold value may be employed as is known in the art. For example, the system may display a "slider" tool for receiving a proximity threshold value from the user with pre-determined slider increments as is known in the art.

Figure 6A:
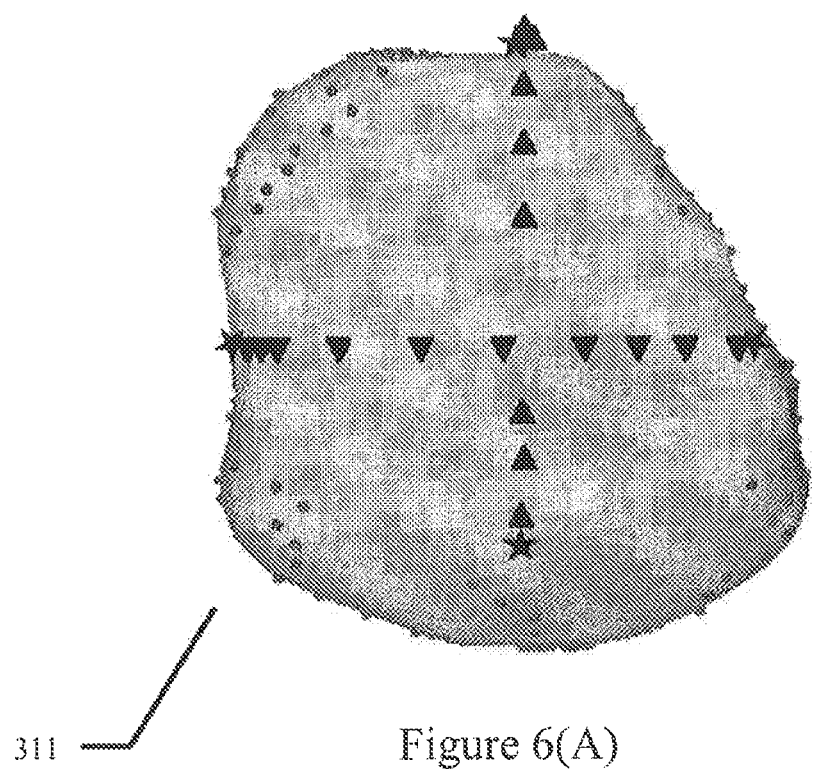
FIGS. 6(A)-6(B) depict an exemplary pre-existing surface with some pre-existing constraint points removed.
Figure 6B:
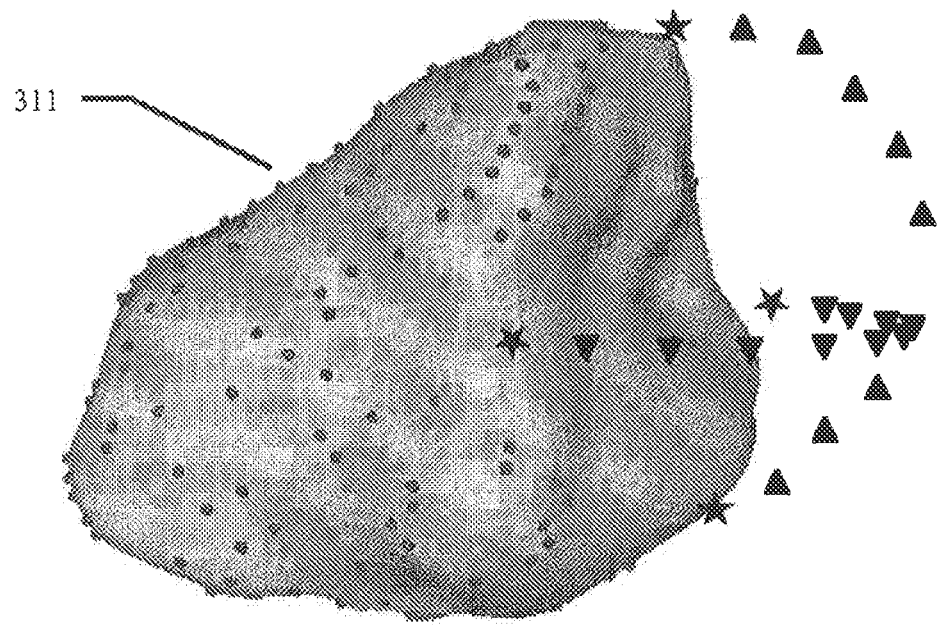

At step 227 the system stores a list of the pre-existing constraint points to be eliminated. It should be noted that rather than storing a list of points for elimination, the system could simply exclude the eliminated points from the new surface data. FIGS. 6(A) and 6(B) show a graphical depiction of exemplary pre-existing surface 311 after elimination of pre-existing constraint points on the surface.

Figure 2C:
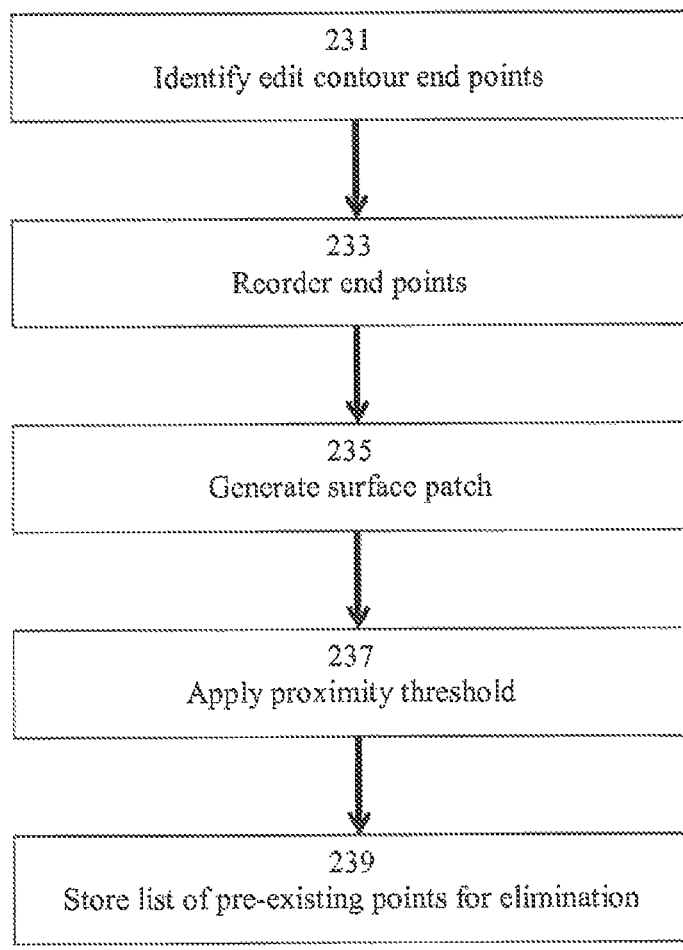
Figure 5A:
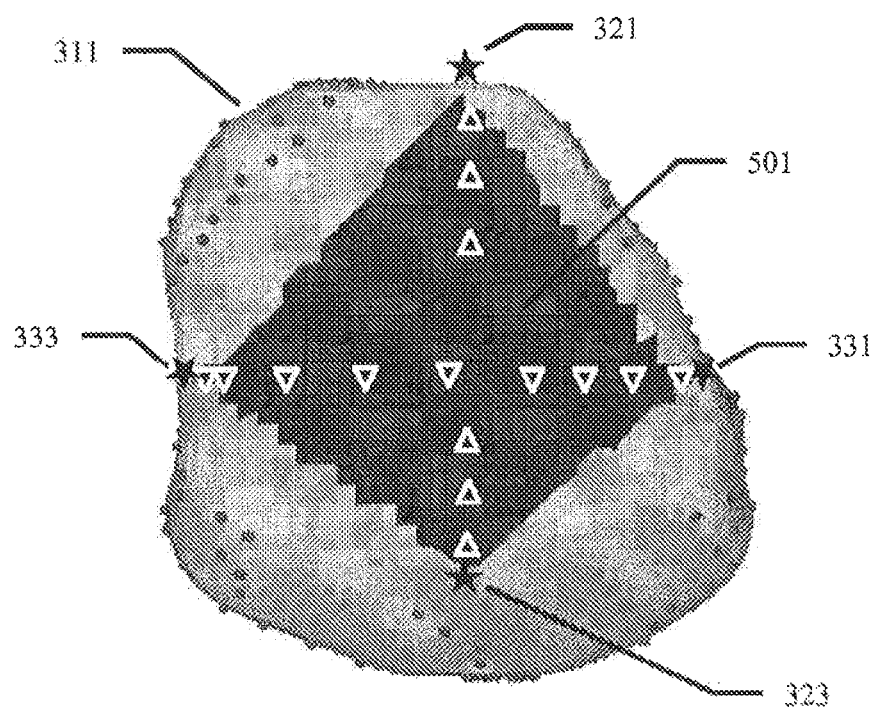
FIGS. 5(A)-5(D) depict an exemplary surface patch.
Figure 5B:
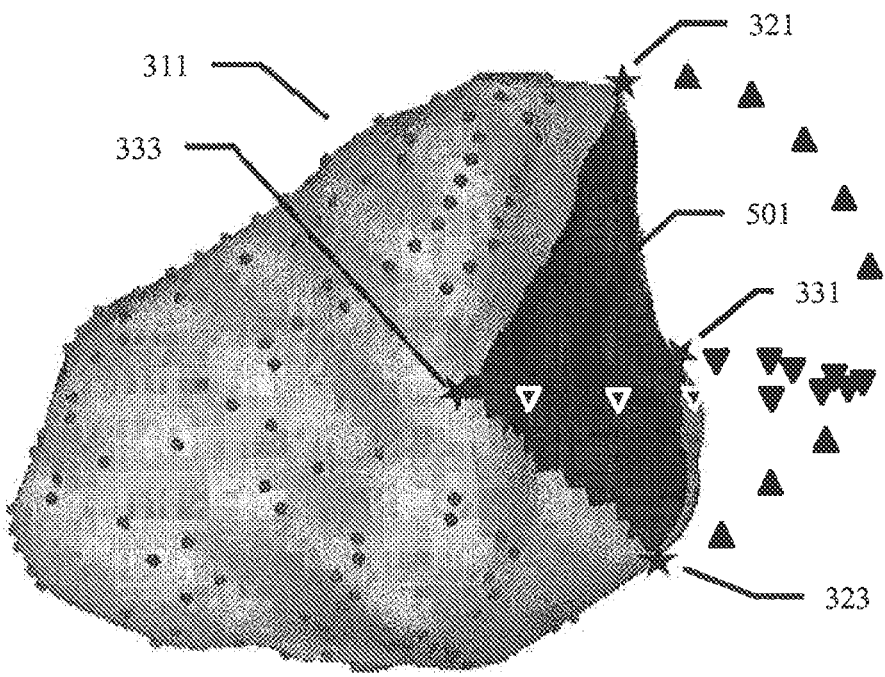

FIG. 2(C) depicts a flow diagram for another exemplary embodiment of identification step 209. The embodiment of FIG. 2(C) is an example of what the inventor refers to as a "surface patch" approach for identifying pre-existing constraint points for elimination. At step 231 the system identifies the end points for each of the received edit contours, e.g. end points 321, 323, 331, and 333. These end points will be ordered in the order in which the corresponding edit contours were received. At step 233 the system assigns the set of end points to an ordinal sequence, in preparation for defining a surface region bounded by the end points. At step 233, the end points are re-ordered to form a continuous, non-self-intersecting polygon, as described in detail below. At step 235, the system feeds the re-ordered set of end points to a surface patch generation algorithm. An exemplary algorithm for generating the surface patch is VTK mesh filter vtkSelectPolyData, available as part of the VTK software system available from Kitware, Inc. of Clifton Park, N.Y. (See Schroeder et al., The Visualization Toolkit, 4th Ed., Kitware, 2006, the entire disclosure of which is incorporated herein by reference). vtkSelectPolyData requires as input a set of points on or near the vertices of a mesh surface. A graphic depiction of an exemplary surface patch 501 generated from the set of four end points 321, 323, 331, and 333 is shown in FIGS. 5(A) and 5(B).

Figure 5C:
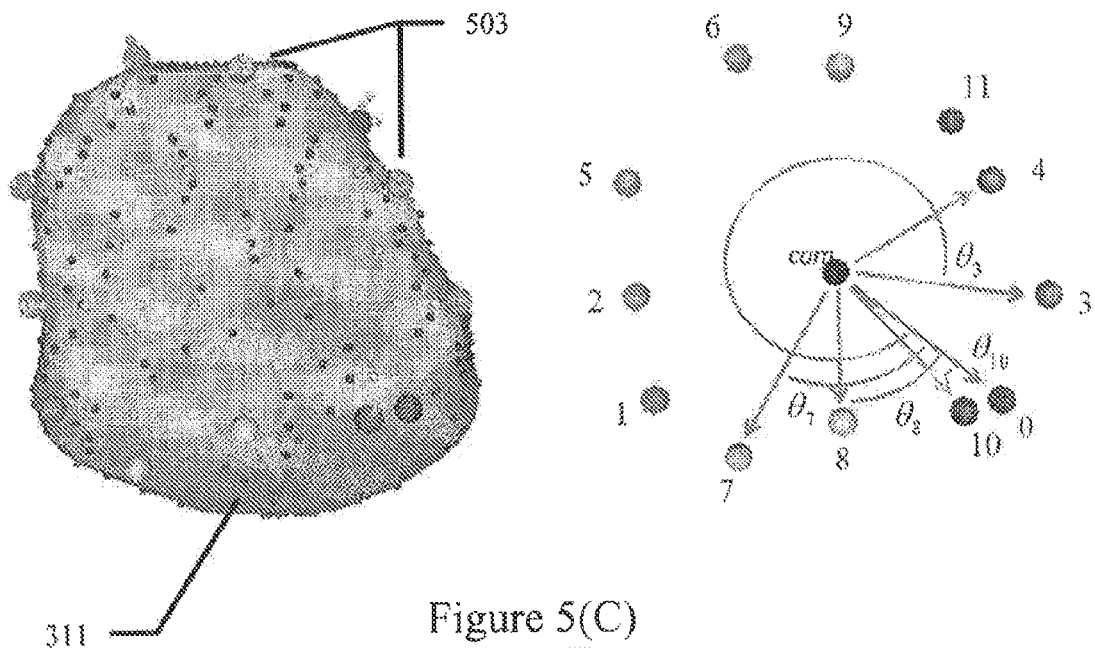
Figure 5D:
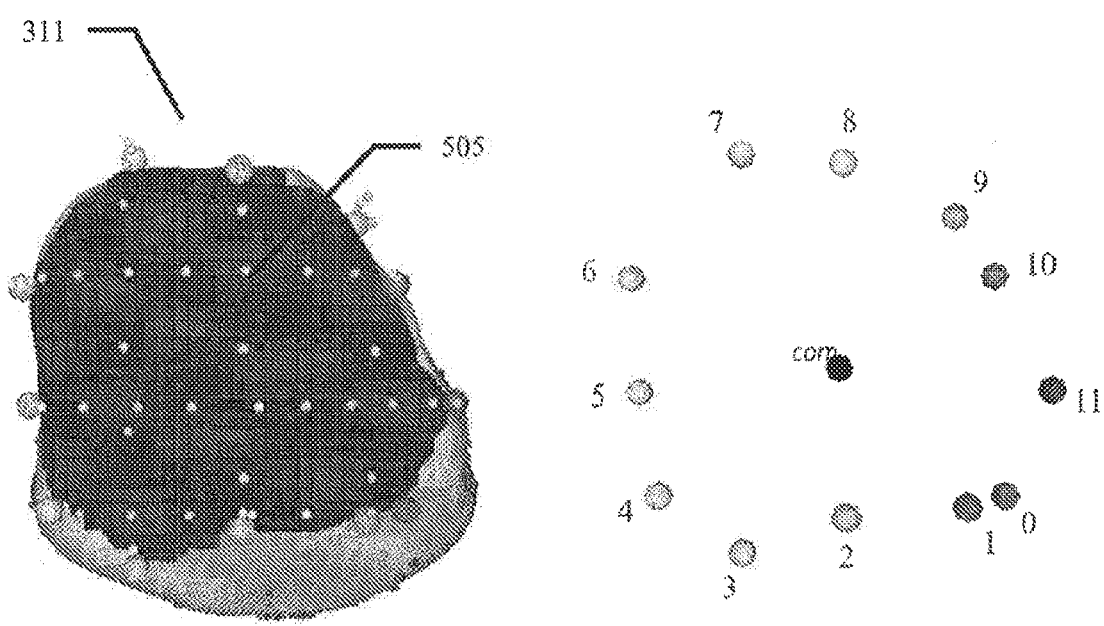

A more detailed depiction of the re-ordering step 233 is shown in FIGS. 5(C) and 5(D). In the embodiment of FIGS. 5(C) and 5(D), the user input edit contours comprise 6 total edit contours (3 each in the transverse and sagittal planes), for a total of 12 edit contour endpoints 503, depicted as relatively large spheres. The edit contour endpoints may be used to define a surface patch region. For use with the VTK mesh filter vtkSelectPolyData algorithm, the endpoints must describe a cyclic polygon that may be non-planar and convex or concave but cannot self-intersect. End points ordered according to the order in which they are received from the user may not satisfy the rule against self-intersection. Reordering is performed to guarantee non-self-intersection, so that the VTK filter can produce a complete surface region that fully spans the area between the endpoints. Re-ordering these points may be performed according to the geometric operation shown in FIG. 5(C). The twelve endpoints 503 are indexed in order in which they were drawn, and are not in cyclic order in FIG. 5(C). To put the endpoints 503 in cyclic order, the first point encountered is assigned as the zero-th point, and its nearest neighbor (10) is determined. The orientation of these two points (0, 10) and the center of mass of all the points (com) defines a rotation direction (here clockwise), and angles $\theta i$ between the 0-th ray and the other points' rays are computed, modulo $2\pi$ as shown in FIG. 5(C). The assignment of new indices is made by reading out the points in order of ascending value of $\theta$, and the resulting reassignment of indices is shown in the lower FIG. 5(D). For each point, the rotation $\theta$ from the 0-point is computed, modulo $2\pi$, and the re-ordered points in FIG. 5(D) correspond to ascending values of $\theta$. The surface patch 505 (dark patch) based on the 12 endpoints 503 is shown in FIG. 5(D) on pre-existing surface 311.

At step 237 the system uses the surface patch to identify pre-existing surface constraint points for elimination. In an exemplary embodiment, the system applies a proximity threshold test to identify all pre-existing data points that are within a pre-set Euclidean threshold distance from any vertex of the surface patch mesh. The pre-set threshold distance effectively defines a 3D "zone of elimination" around each surface patch vertex, such that any pre-existing constraint point within the zone will be eliminated. At step 239 the system stores a list of pre-existing points to be eliminated (similar to step 227). In an exemplary embodiment wherein both the surface projection approach and surface patch approach are used, the system may use the same stored list of pre-existing constraint points to be eliminated. For example, at step 239 the system may append additional points for elimination to the list.

Figure 2D:
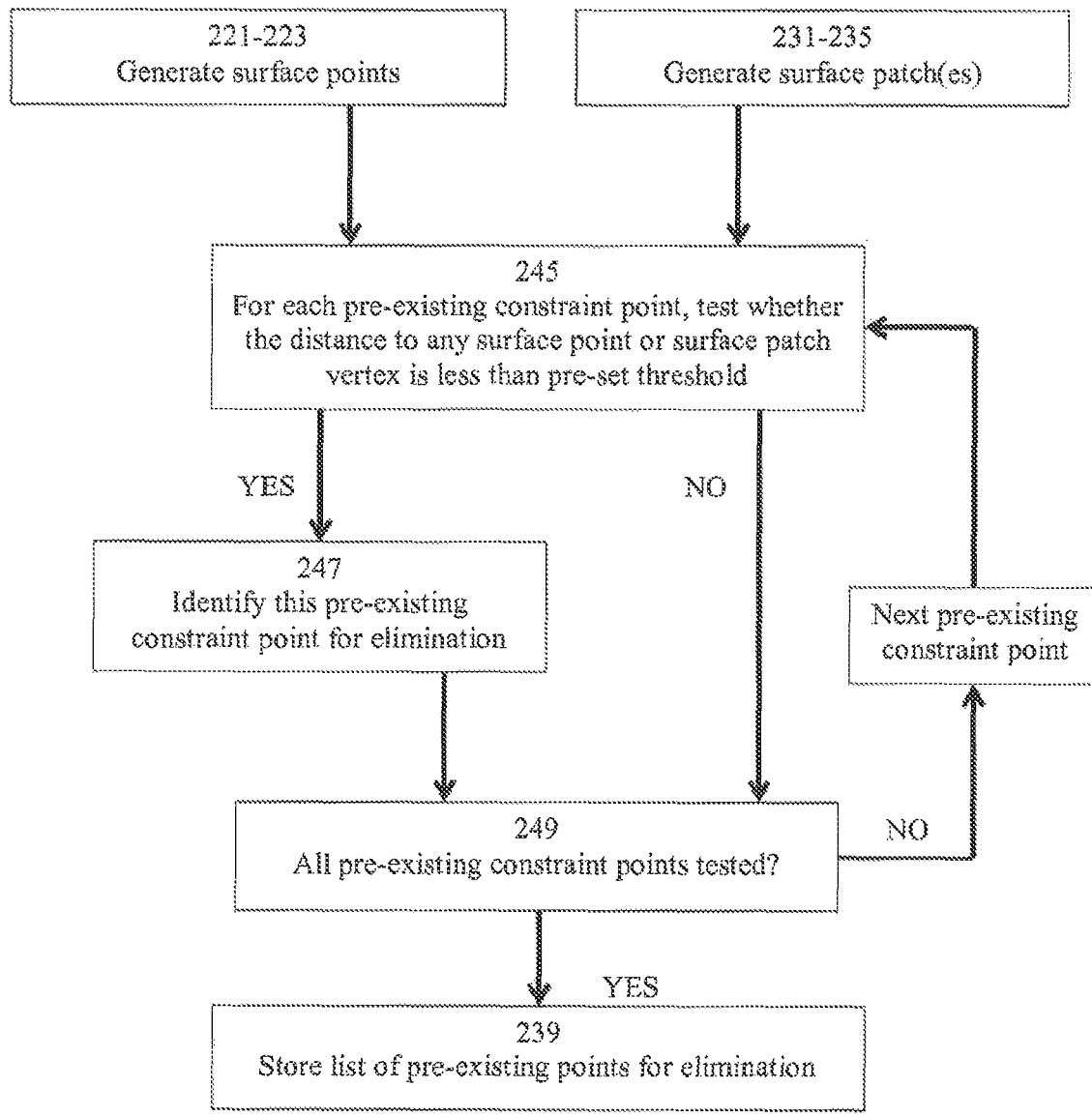

FIG. 2(D) depicts a detailed flow diagram for an exemplary process for applying a proximity threshold for both a surface projection point test and a surface patch test. The flow of FIG. 2(D) begins with steps 221-223 and 231-235.

The system may be programmed to perform the two approaches in a parallel fashion. For example, a computer having multiple processing units (e.g. CPUs and/or CPU cores) could be programmed to use a first processing unit to generate surface projection points (e.g., steps 221-223) and a second processing unit to simultaneously generate one or more surface patches (e.g., steps 231-235). For example, in the exemplary embodiment of FIG. 33(B), the first parallel processing unit may be sub-processor 1306 and the second parallel processing unit may be sub-processor 1308.

At step 245, the system applies a combined proximity threshold test using both the surface projection points from step 223 and the surface patches from step 235. For each pre-existing constraint point, the system loops through each surface projection point and surface patch vertex, and determines the Euclidean distance from the pre-existing constraint point. If the distance is less than the threshold, then flow proceeds to step 247 wherein the system identifies the pre-existing constraint point for elimination. Thus, this embodiment efficiently eliminates pre-existing constraint points based on both the surface projection points and surface patch approaches.

At step 249, the system determines whether the loop has iterated through all pre-existing constraint points. If not, flow proceeds to step 245 for the next pre-existing constraint point. If the loop is finished, then flow proceeds to step 239 where the system stores the list of pre-existing constraint points for elimination.

It should also be noted that the system could also perform the two approaches separately (e.g. perform the process of FIG. 2(B) separately from the process of FIG. 2(C)).

Figure 7A:
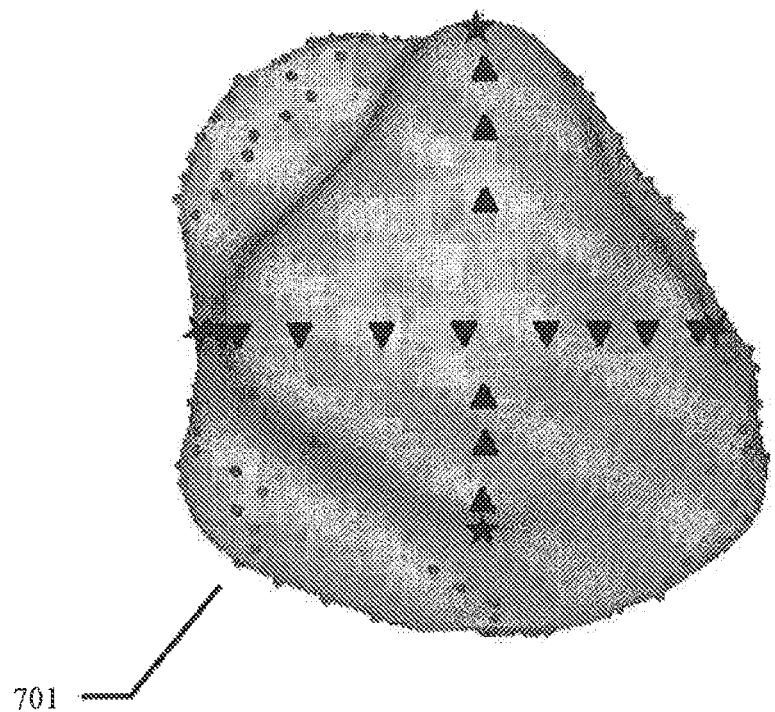
FIGS. 7(A)-7(B) depict an exemplary new corrected three-dimensional surface.
Figure 7B:
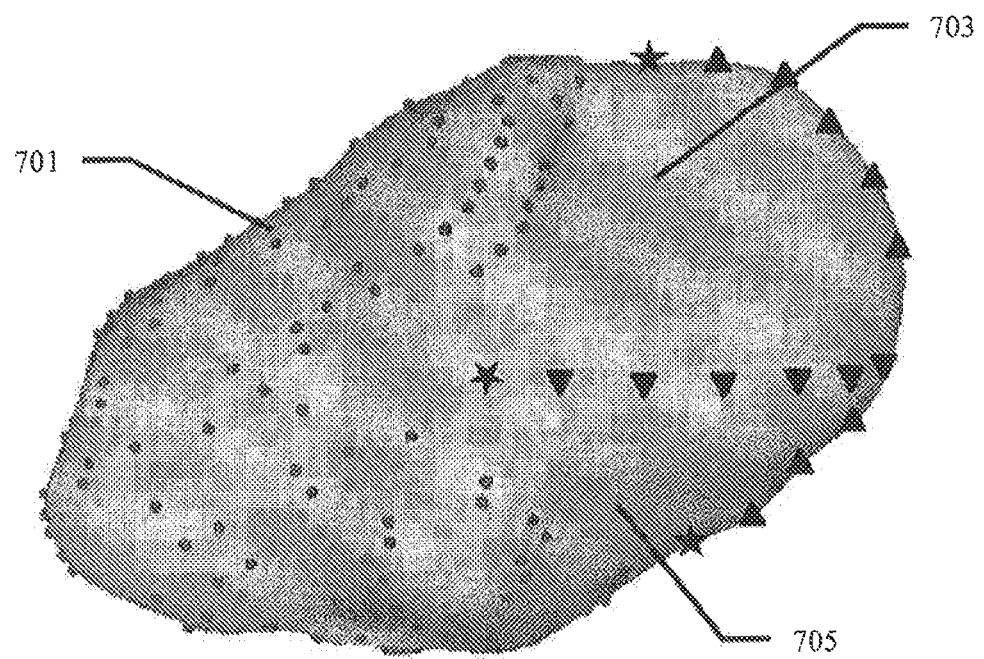

FIGS. 7(A) and 7(B) depict an exemplary new 3D surfaces for representing bladder 101 after the elimination of pre-existing constraint points according to the above process. As can be seen, the under-segmentation has been substantially corrected, but the new surface still suffers from some under-segmentation apparent in deformities 703 and 705.

FIGS. 8(A)-8(F), described below, show how the quality of the correction is affected by adjusting the pre-set proximity threshold and number of received edit contours for use with the "surface projection point" approach.

Figure 8A:
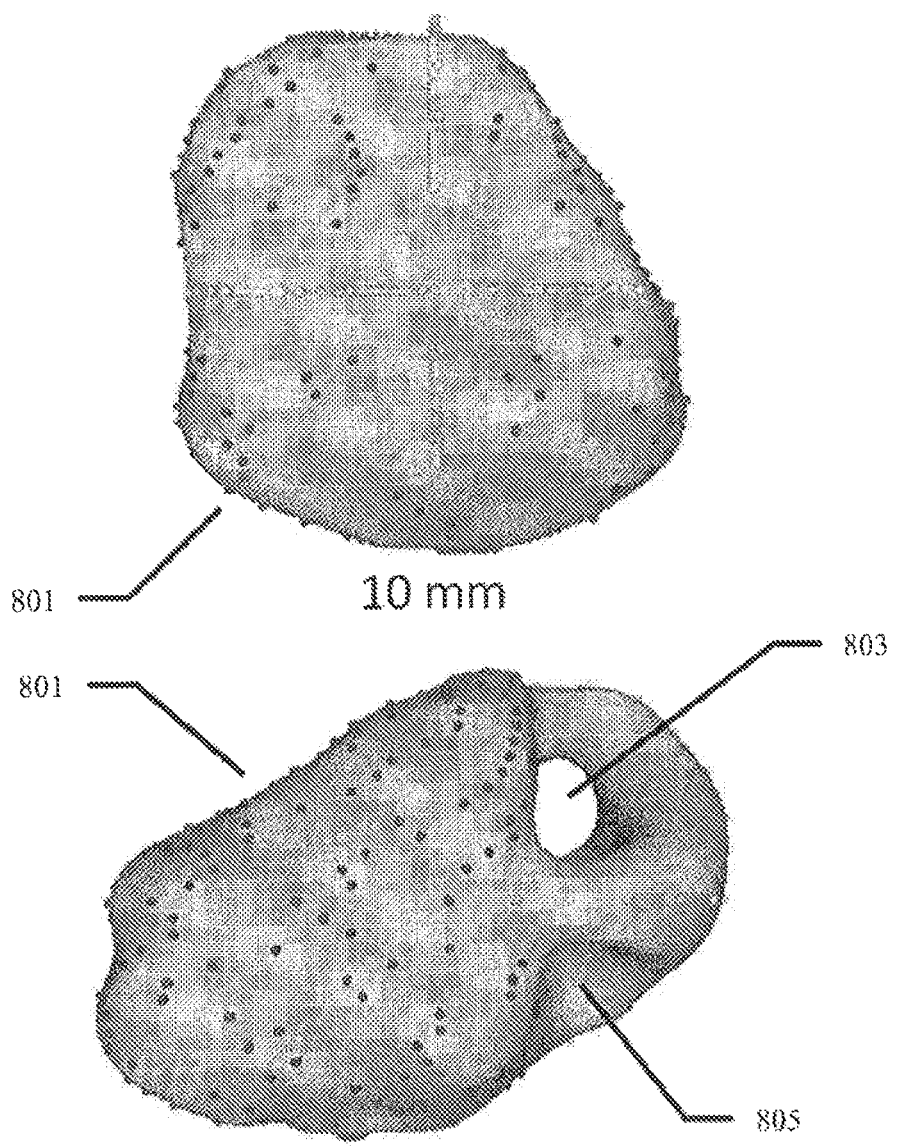
FIGS. 8(A)-8(F) depict exemplary outputs of the "surface projection points" approach.

FIG. 8(A) depicts a new, corrected surface 801 for bladder 101 based on a proximity threshold of 10 mm, using only two edit contours. As can be seen, this surface suffers from deformities 803 and 805.

Figure 8B:
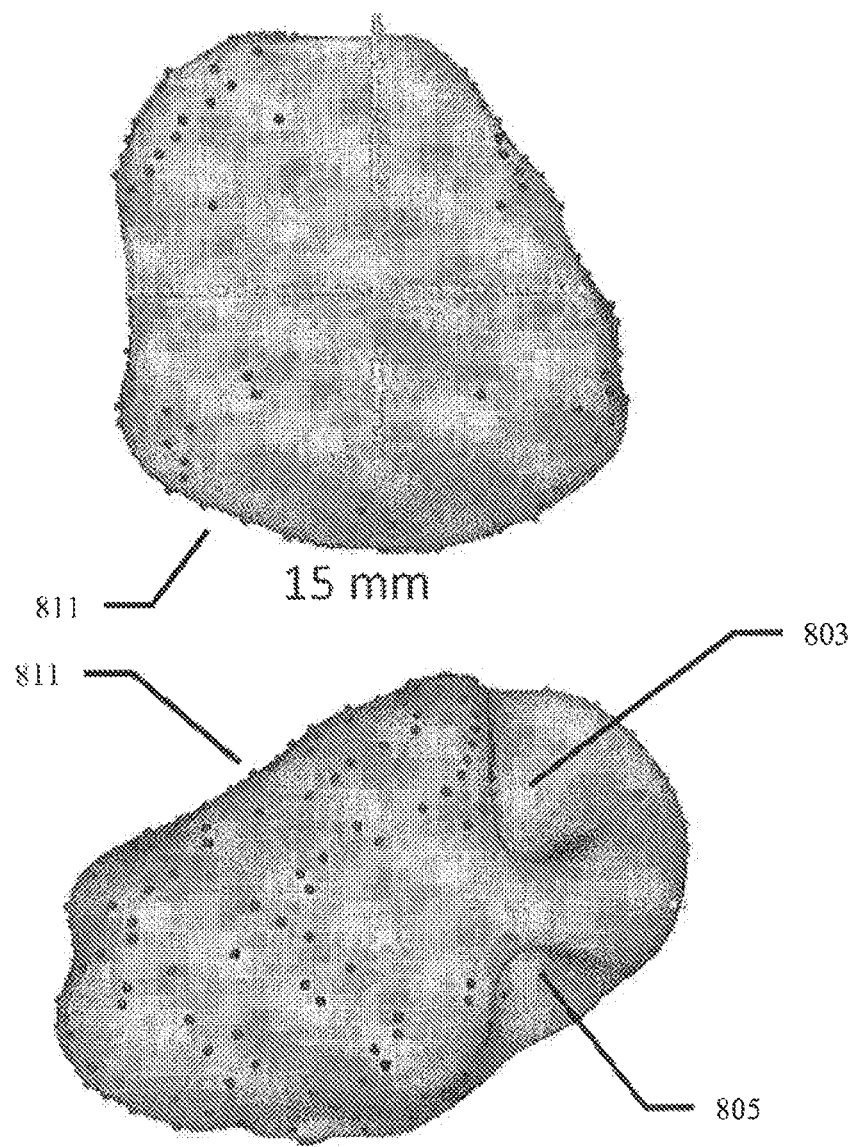

FIG. 8(B) depicts a new, corrected surface 811 for bladder 101 based on a proximity threshold of 15 mm, using only two edit contours. As can be seen, deformities 803 and 805 are slightly reduced relative to FIG. 8(A).

Figure 8C:
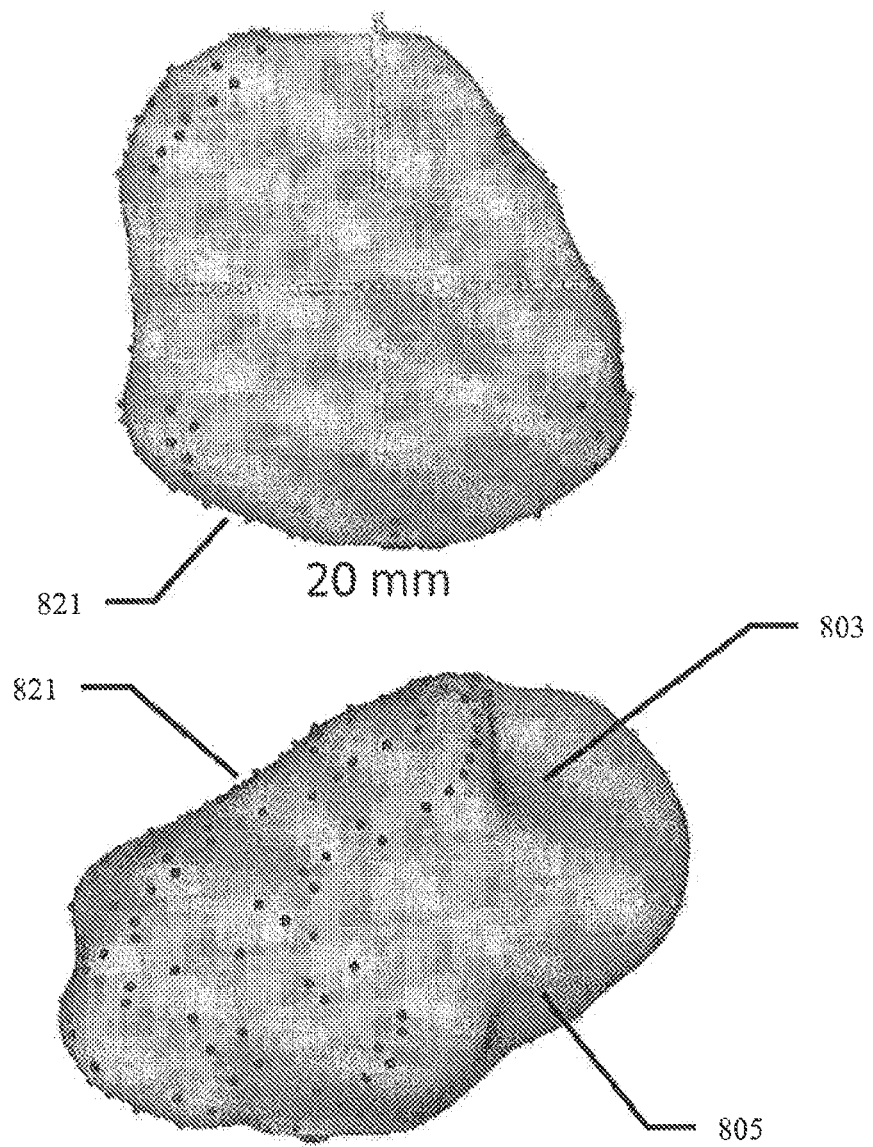

FIG. 8(C) depicts a new, corrected surface 821 for bladder 101 based on a proximity threshold of 20 mm, using only two edit contours. As can be seen, deformities 803 and 805 are substantially reduced relative to FIG. 8(A).

Figure 8D:
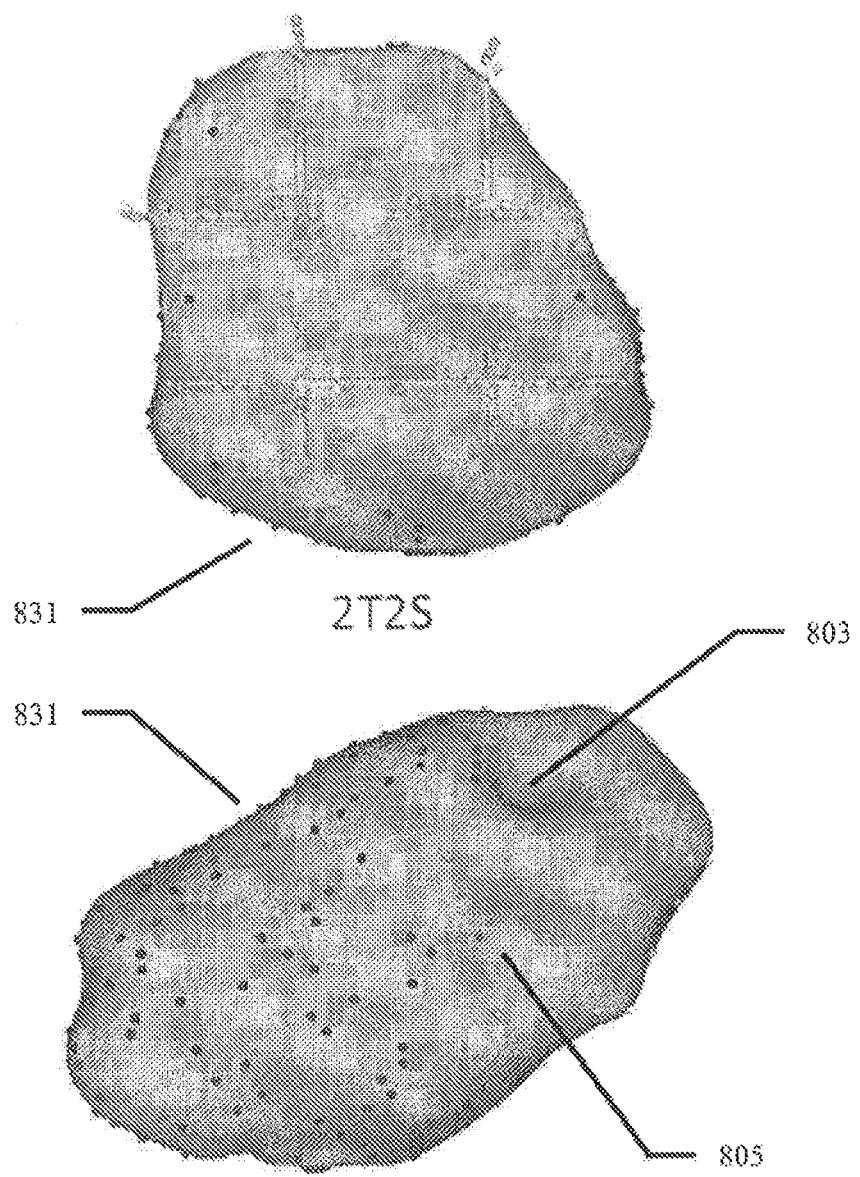

FIG. 8(D) depicts a new, corrected surface 831 for bladder 101 based on a proximity threshold of 15 mm, using four edit contours (2 transverse and 2 sagittal). As can be seen, deformities 803 and 805 are substantially reduced relative to any of FIGS. 8(A)-8(C).

Figure 8E:
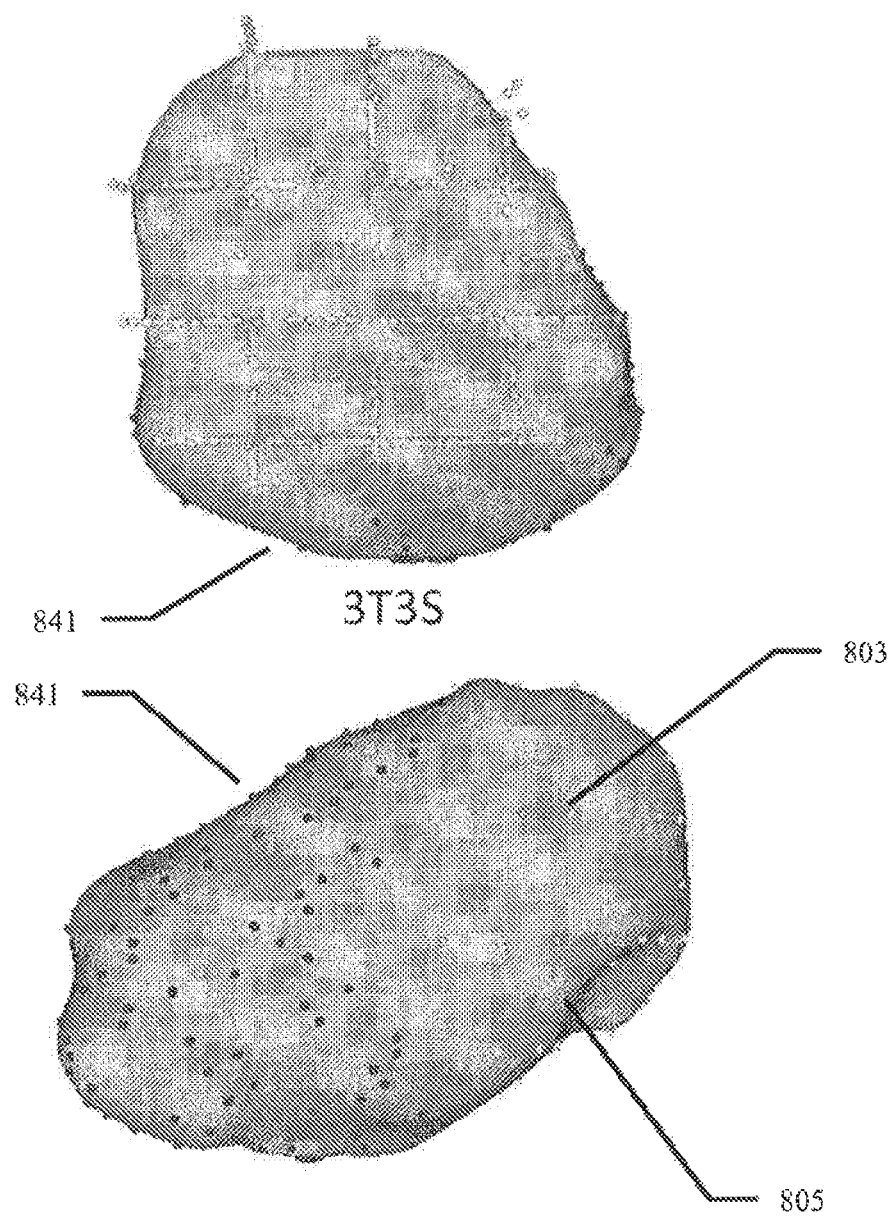

FIG. 8(E) depicts a new, corrected surface 841 for bladder 101 based on a proximity threshold of 15 mm, using six edit contours (3 transverse and 3 sagittal). As can be seen, deformities 803 and 805 are almost unnoticeable.

Figure 8F:
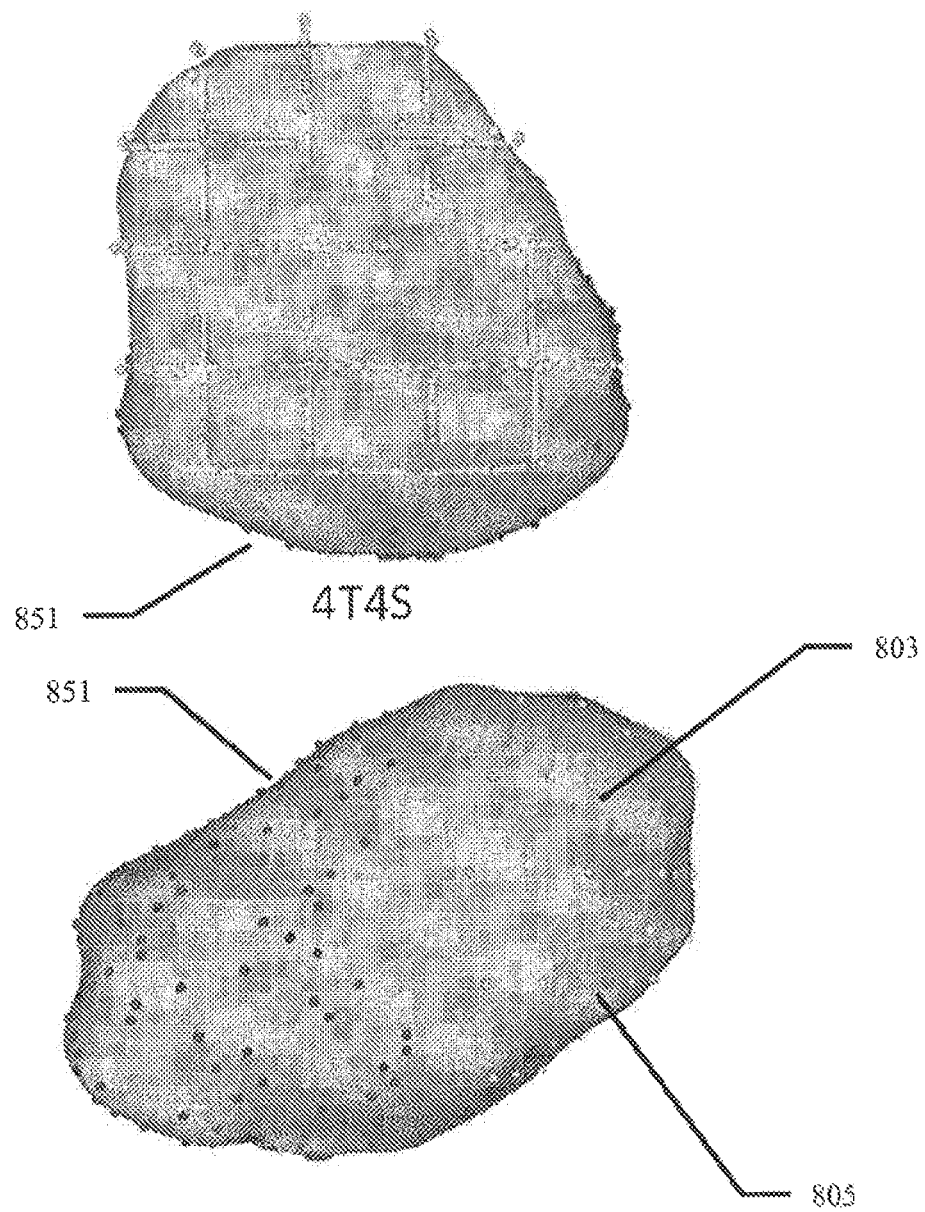

FIG. 8(F) depicts a new, corrected surface 851 for bladder 101 based on a proximity threshold of 15 mm, using eight edit contours (4 transverse and 4 sagittal). As can be seen, deformities 803 and 805 are almost completely eliminated.

FIGS. 9(A)-9(F), described below, show how the quality of the correction is affected by adjusting the pre-set proximity threshold and number of received edit contours for use with the "surface patch" approach.

Figure 9A:
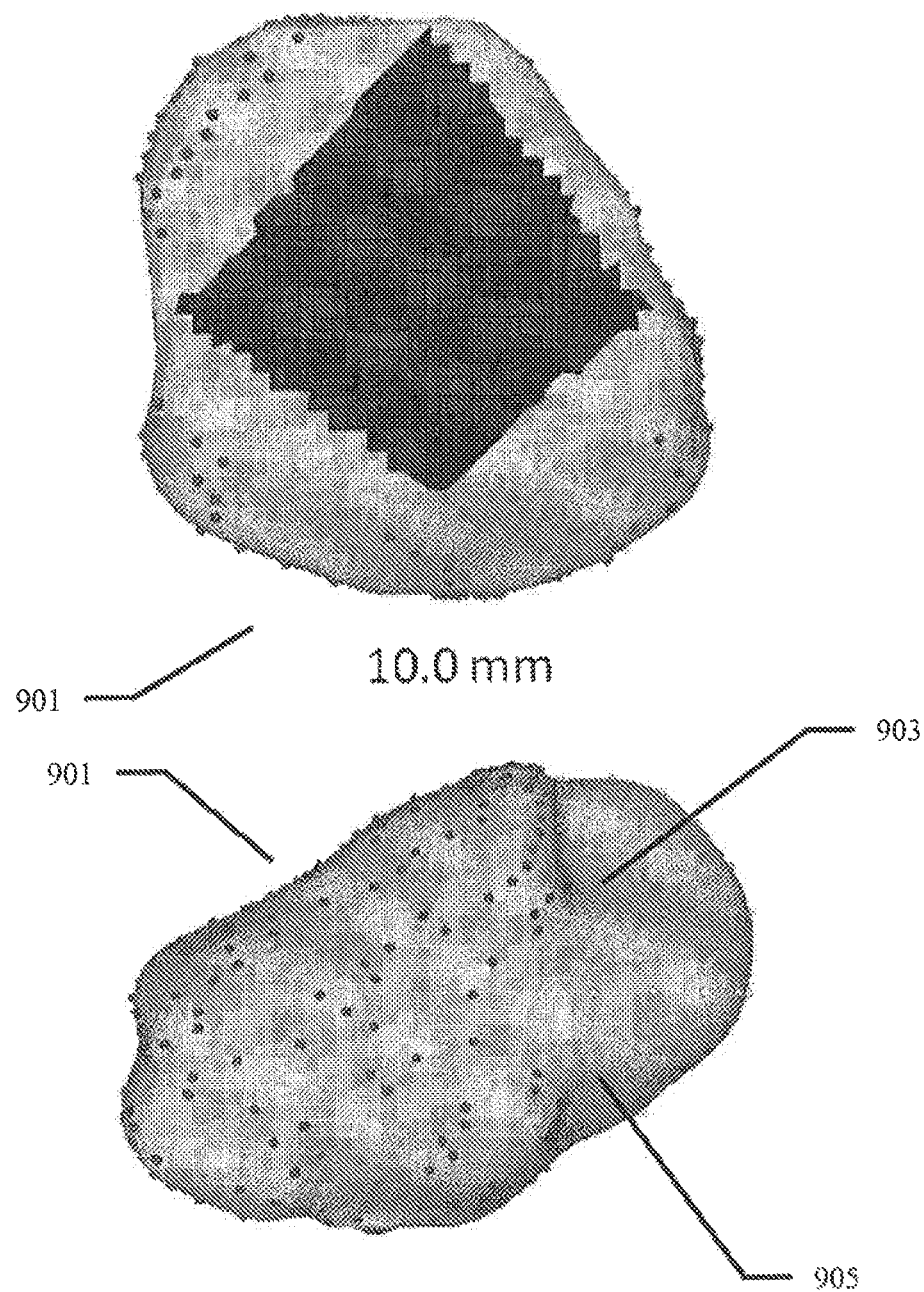
FIGS. 9(A)-9(F) depict exemplary outputs of the "surface patch" approach.

FIG. 9(A) depicts a new, corrected surface 901 for bladder 101 based on a proximity threshold of 10 mm, using only two edit contours. As can be seen, new surface 901 suffers from deformities 903 and 905.

Figure 9B:
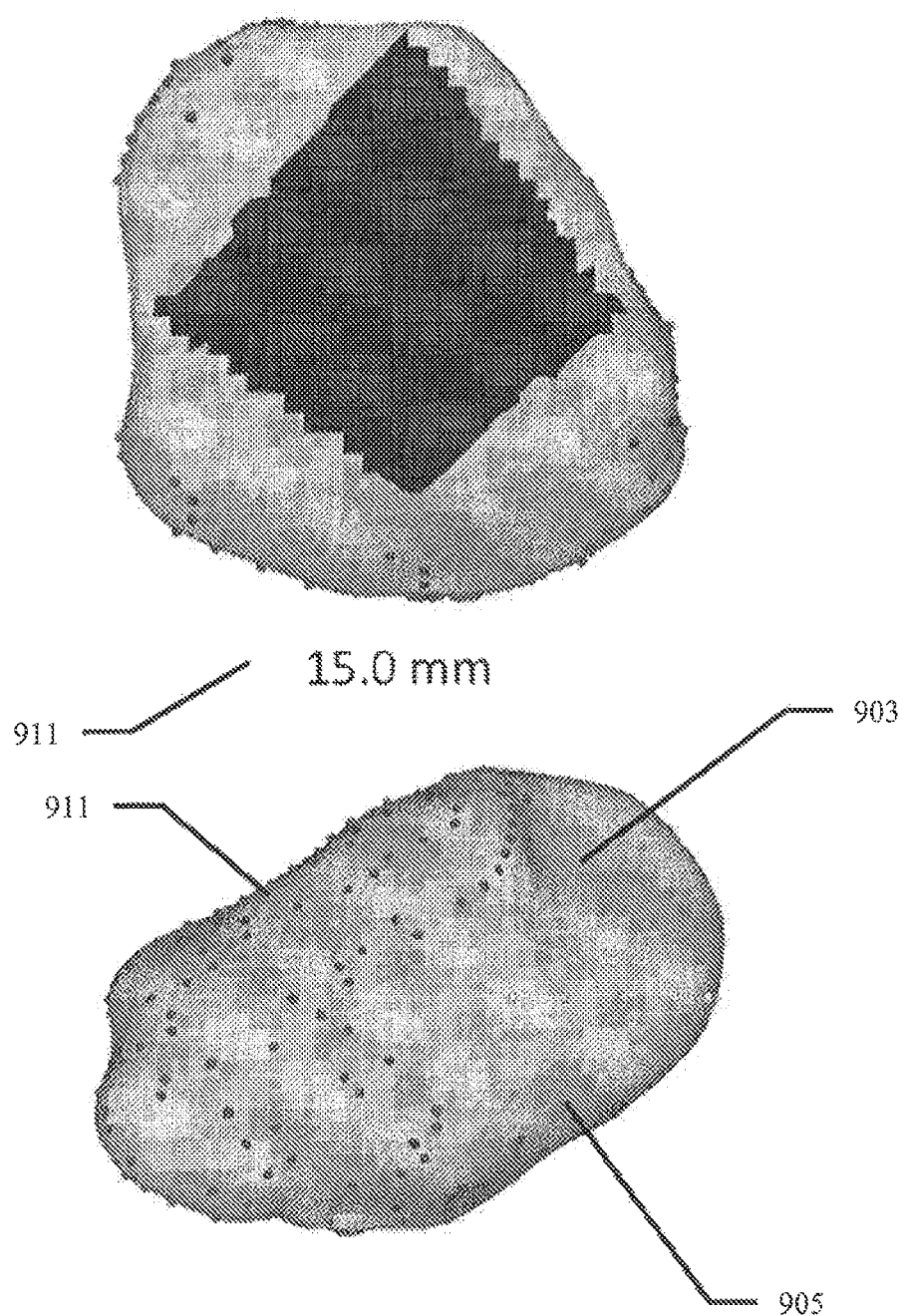

FIG. 9(B) depicts a new, corrected surface 911 for bladder 101 based on a proximity threshold of 15 mm, using only two edit contours. As can be seen, deformities 903 and 905 are slightly reduced relative to FIG. 9(A).

Figure 9C:
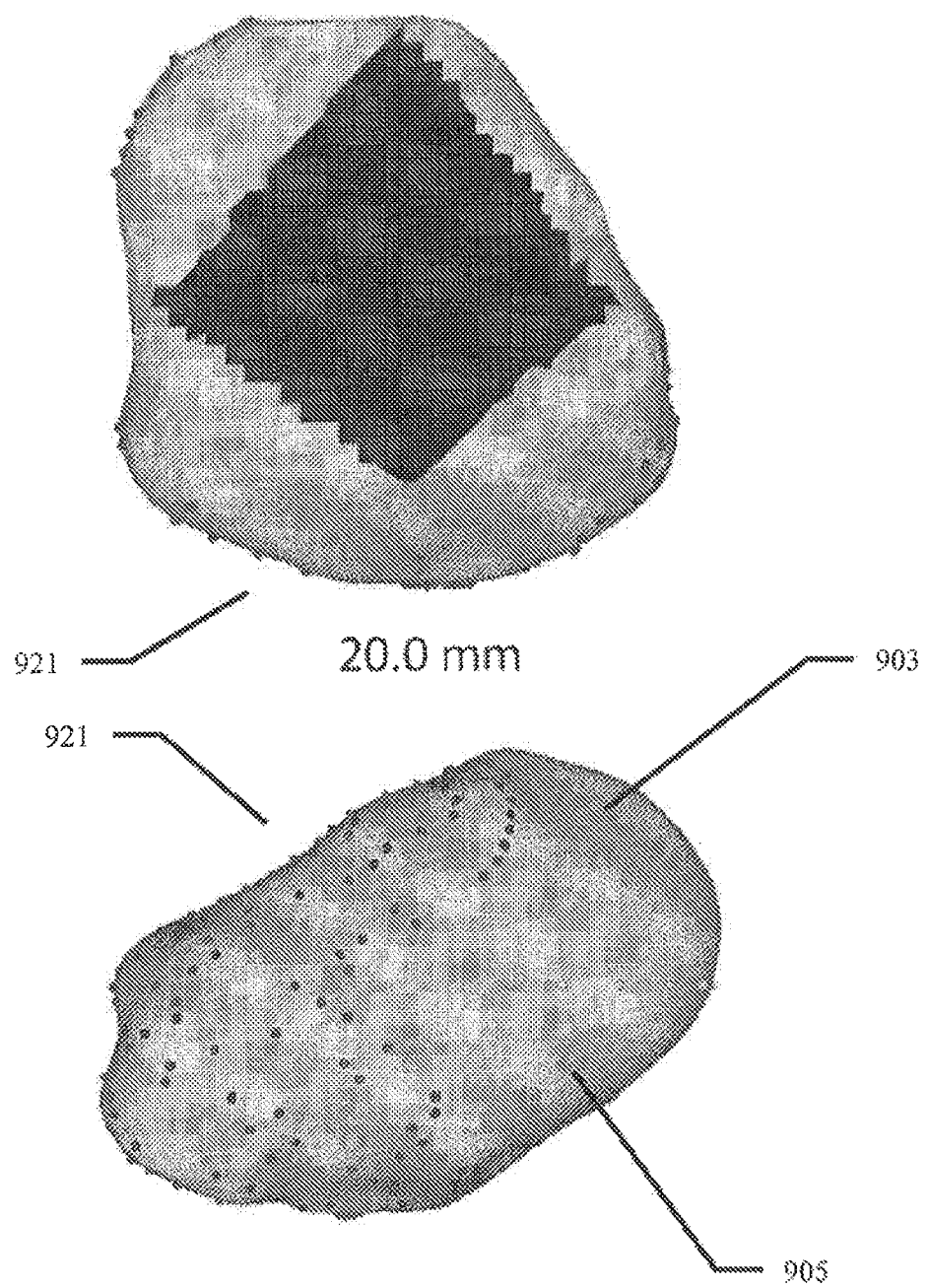

FIG. 9(C) depicts a new, corrected surface 921 for bladder 101 based on a proximity threshold of 20 mm, using only two edit contours. As can be seen, deformities 903 and 905 are slightly reduced relative to FIG. 9(B).

Figure 9D:
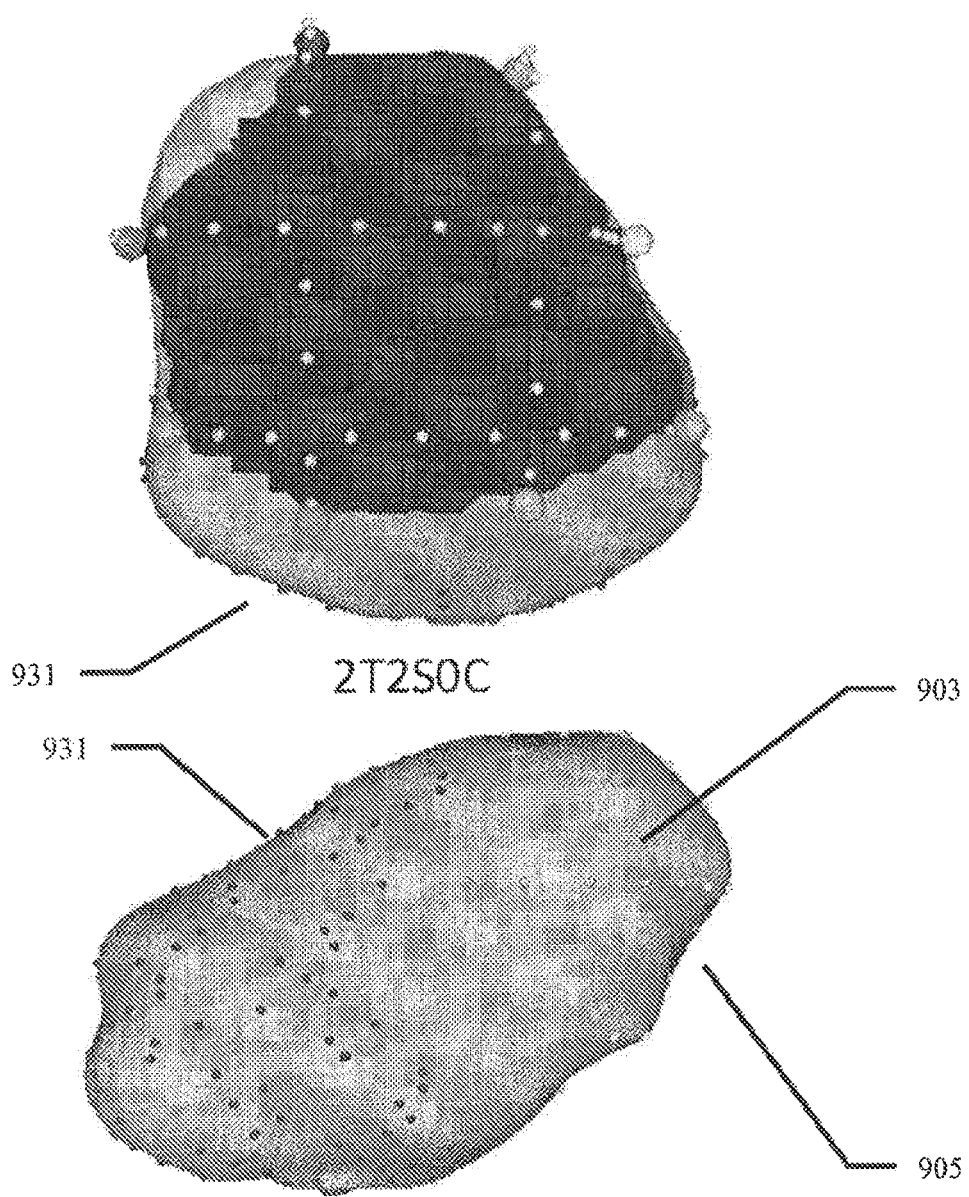

FIG. 9(D) depicts a new, corrected surface 931 for bladder 101 based on a proximity threshold of 15 mm, using four edit contours (2 transverse and 2 sagittal). As can be seen, deformities 903 and 905 are substantially reduced relative to any of FIGS. 9(A)-9(C).

Figure 9E:
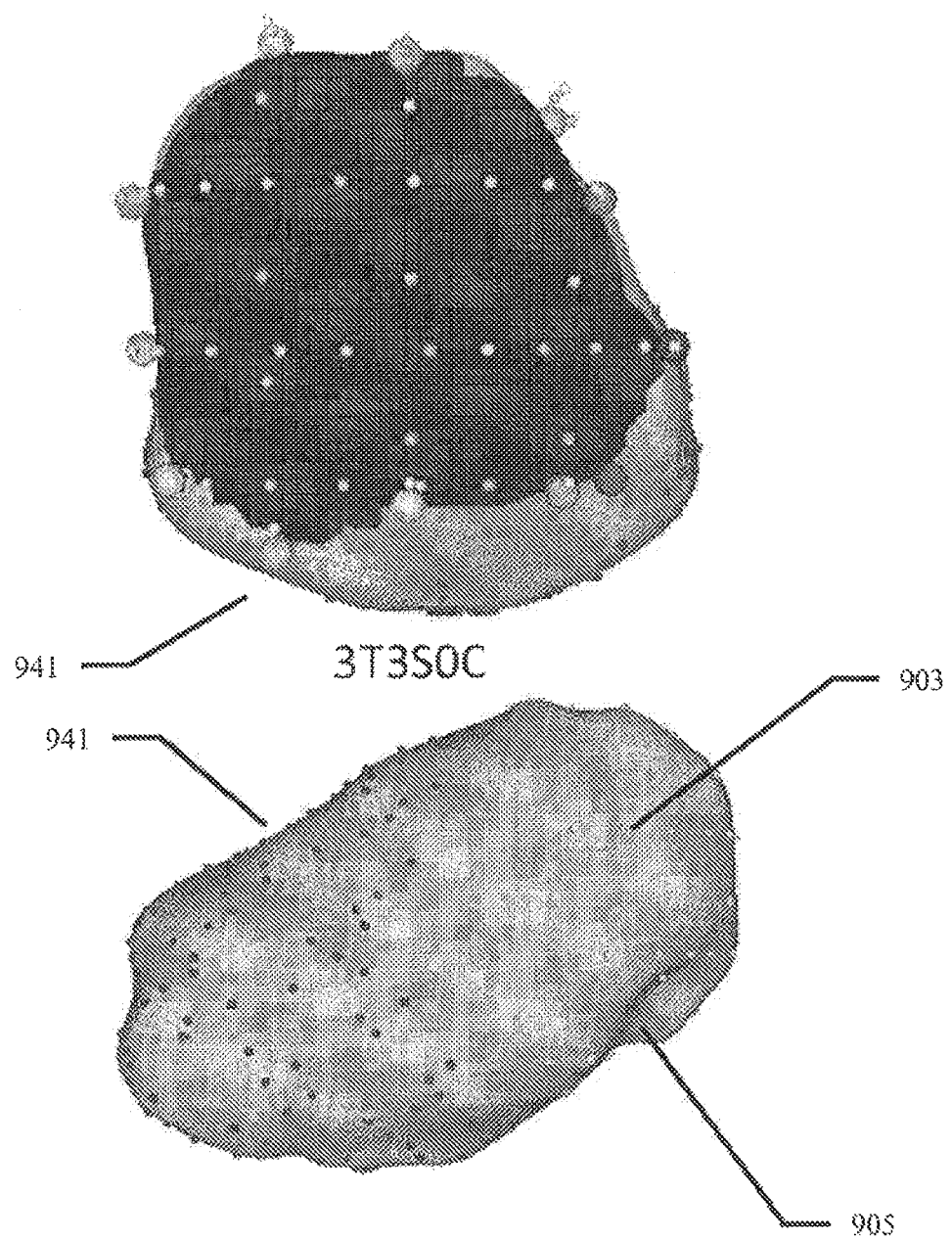

FIG. 9(E) depicts a new, corrected surface 941 for bladder 101 based on a proximity threshold of 15 mm, using six edit contours (3 transverse and 3 sagittal). As can be seen, deformities 903 and 905 are substantially reduced relative to any of FIGS. 9(A)-9(D).

Figure 9F:
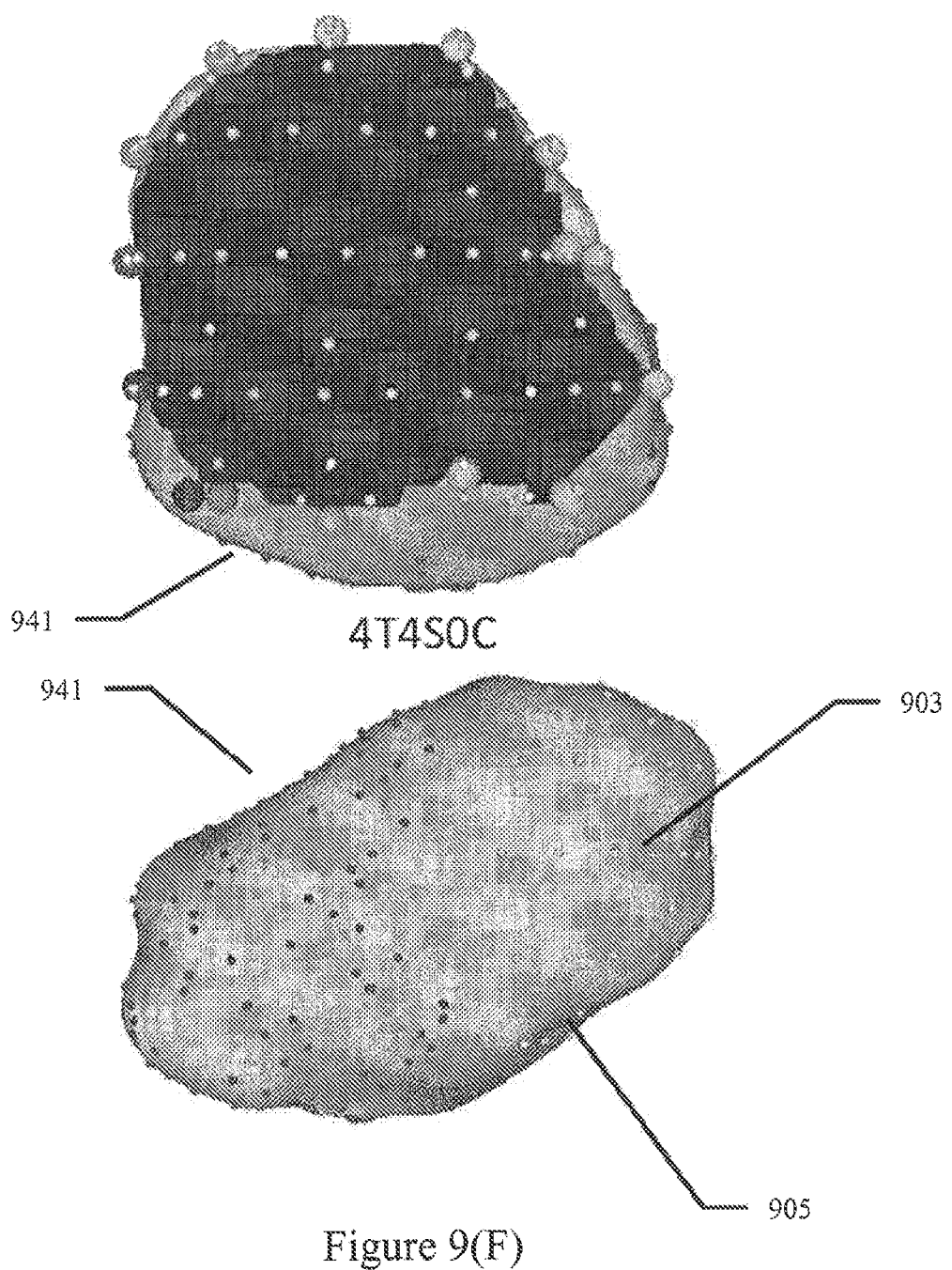

FIG. 9(F) depicts a new, corrected surface 951 for bladder 101 based on a proximity threshold of 15 mm, using eight edit contours (4 transverse and 4 sagittal). As can be seen, deformities 903 and 905 are almost completely eliminated.

Figure 10:
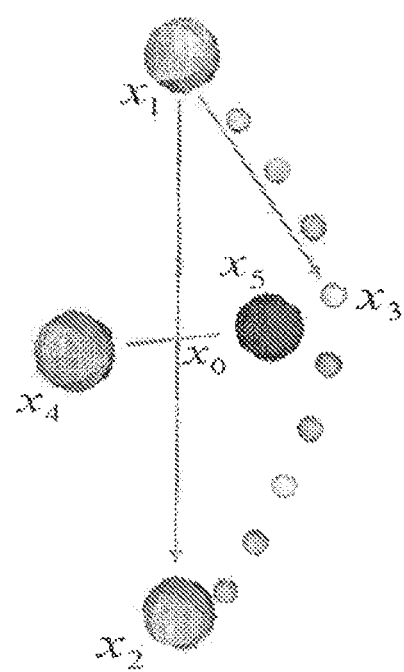
FIG. 10 depicts augmented end points based on a single edit contour.

FIG. 10 depicts an exemplary embodiment for use with only a single edit contour. For both the surface projection points approach and the surface patch approach, the edit-affected surface region must be specified in order to identify old constraints to be eliminated. In an embodiment in which the user has provided only a single edit contour with only two endpoints, additional information must be provided in order to use the VTK surface patch generation program. In principle, the surface point test could work with only two endpoints, but the VTK surface patch generation program requires at least three points to specify a non-trivial region. The geometric construction of FIG. 10 was devised to provide two augmented end points based on a single contour. A single edit contour has end points x1 and x2. The single edit contour endpoints $x_1, x_2$ are augmented by a second pair, $x_4, x_5$ as shown below. Point $x_3$ is the location of a new constraint approximately ½ the distance between the endpoints, and $x_0$ is the midpoint of the $x_1, x_2$ line segment. The new points $x_4, x_5$ are on a line perpendicular to the plane defined by points $x_1, x_2, x_3$ that passes through midpoint x. The height of the edit contour is taken to be the distance $\|x_3 - x_0\|$. The distances $\|x_4 - x_0\|$ and $\|x_5 - x_0\|$ are +1, -1 multiplied by the distance $\|x_3 - x_0\|$, taken to be the height of the edit contour. A new constraint point x3 is selected approximately midway along the edit contour between the endpoints x1 and x2. The normal vector for the plane defined by x1, x2, x3 is given by Equation 12:

$$n = \frac{(x_2 - x_1) \times (x_3 - x_1)}{\|(x_2 - x_1) \times (x_3 - x_1)\|} \qquad \text{EQ (12)}$$

where $\| \; \|$ is the scalar length of the vector cross product. The midpoint between the endpoints is x0=(x1+x2)/2, and the height of the curve through the new constraints is approximated by the difference vector h=x3−x0 with scalar length H=∥h∥. New points x4 and x5 are created according to the following equations:

$$x4 = x0 + Hn \qquad \text{EQ(13)}$$

$$x5 = x0 - Hn \qquad \text{EQ(14)}$$

Interpolated constraint points x4 and x5 bring the total number of available end points to 4, thus allowing use of the VTK surface patch generation algorithm in the "surface patch" approach, and/or providing additional surface projection points in the "surface projection" approach.

Figure 11A:
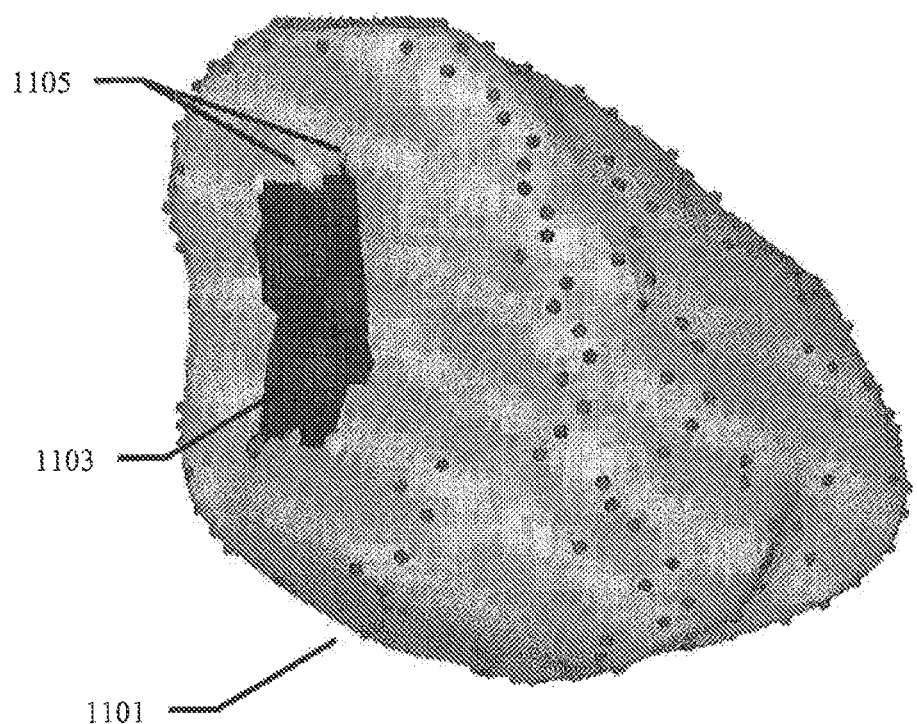
FIGS. 11(A)-11(C) depict exemplary embodiments for correcting an over-segmentation error.
Figure 11B:
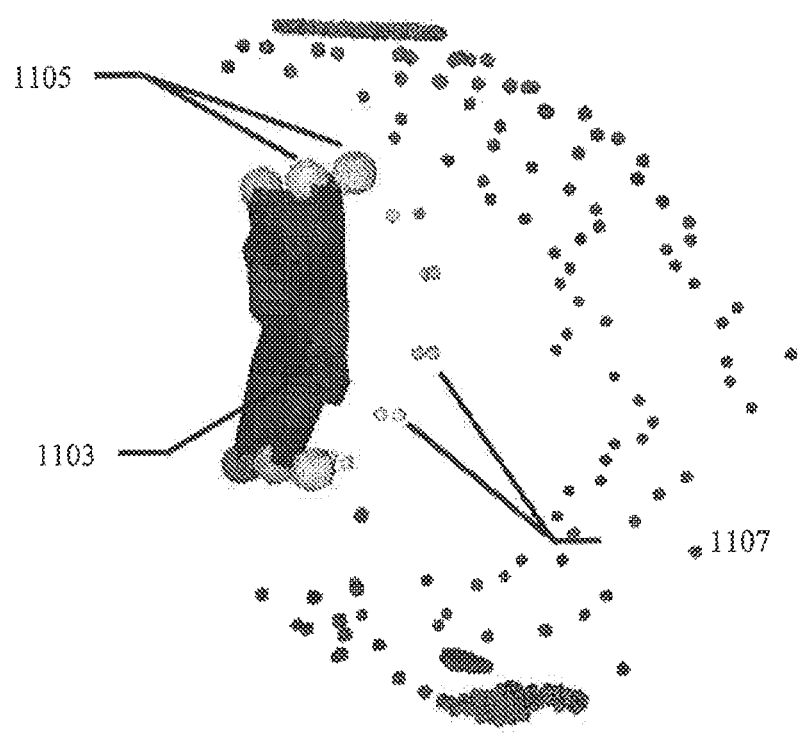
Figure 11C:
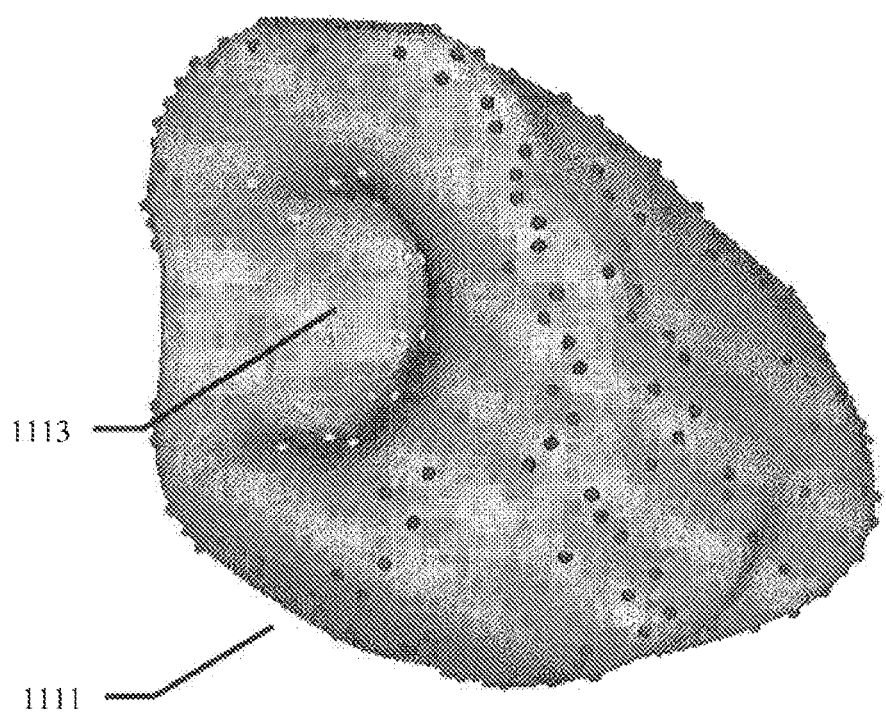
Figure 12A:
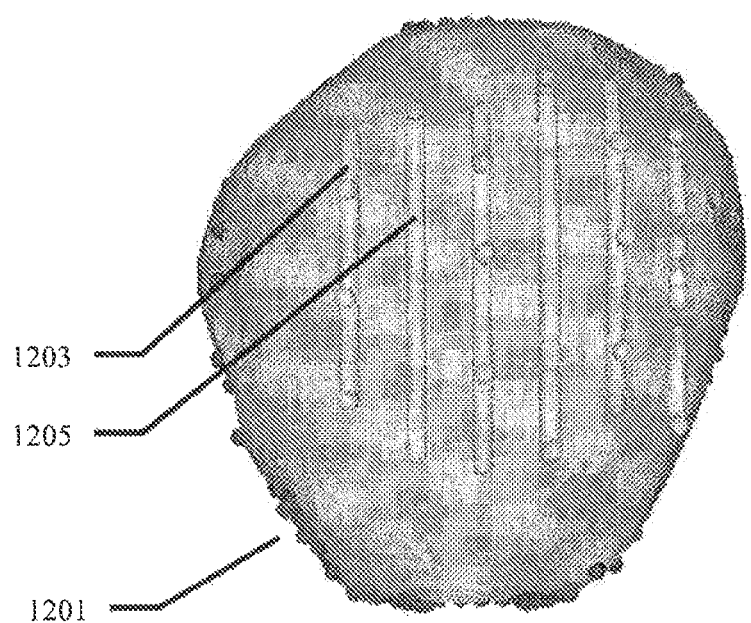
FIG. 12(A)-12(D) depict exemplary embodiments for correcting multiple segmentation errors on a single object.

FIGS. 11(A)-11(C) depict an exemplary embodiment wherein an anatomical structure has been over-segmented as shown in pre-existing surface 1101. As shown in FIG. 11(B), the surface patch is created based on the end points 1105 of three received edit contours. As described above, the surface patch 1103 is generated on pre-existing surface 1101. The techniques described are fully applicable to over-segmentation as well as under-segmentation, or any combination thereof. The main difference with over-segmentation is that the edit contours extend into the volume of the pre-existing surface. Thus, FIG. 11(B) does not show the pre-existing surface so that the edit contour constraint points 1107 are visible within. FIG. 11(C) depicts a new corrected surface 1111 having a concave portion 1113 that was lacking in pre-existing surface 1101. FIGS. 12(A)-11(C) show the surface patch approach used to correct the over-segmentation, but it should be understood that the surface projection approach could be used instead of, or in addition to the surface patch approach.

Figure 12B:
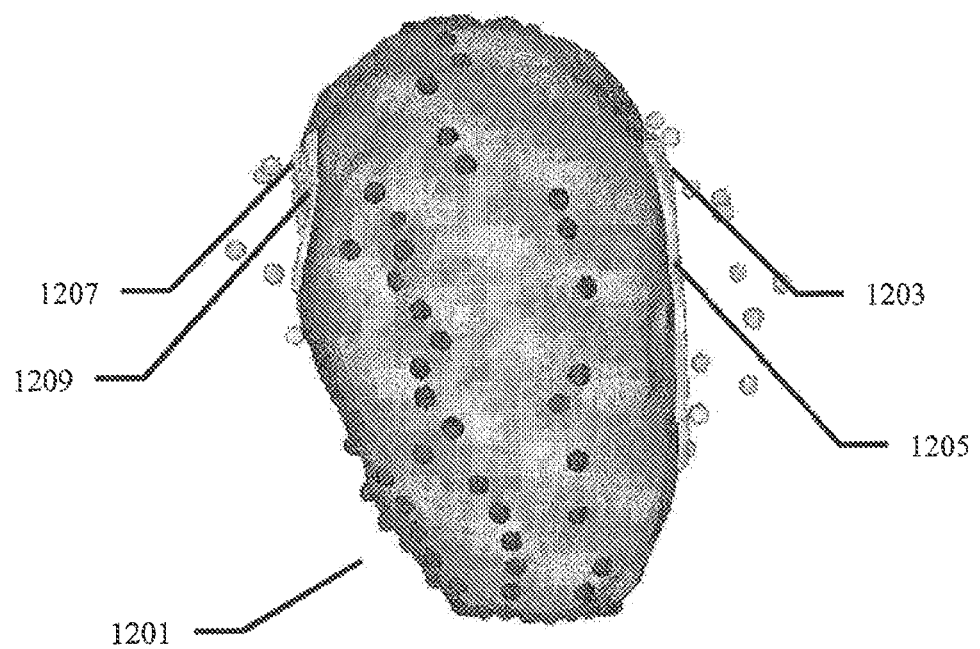

FIGS. 12(A)-12(D) illustrate an embodiment wherein multiple edit contours are received from the user and applied to an object of interest (e.g. anatomical structure). For example, in the case of a pre-existing surface having multiple segmentation errors, the user will likely provide edit contours for each error. These multiple edit contours may be "disjoint" in that they correspond to unconnected regions on the surface. The surface projection points approach may be used in conjunction with multiple disjoint edit contours. As shown in FIG. 12(B), the system generates surface projection points for each edit contour as described above.

The surface patch approach could also be used with multiple disjoint edit contours. To allow generation of multiple surface patches for an object, it would be preferable that the contour editing software allow the user to assign edit contours to a corresponding segmentation error. For example, the user could specify that a first set of edit contours corresponds to segmentation error A, while a second set of edit contours corresponds to segmentation error B. When generating surface patches, the first set of edit contours would be used to generate a first surface patch, and the second set of edit contours would be used to generate a second surface patch.

Figure 12C:
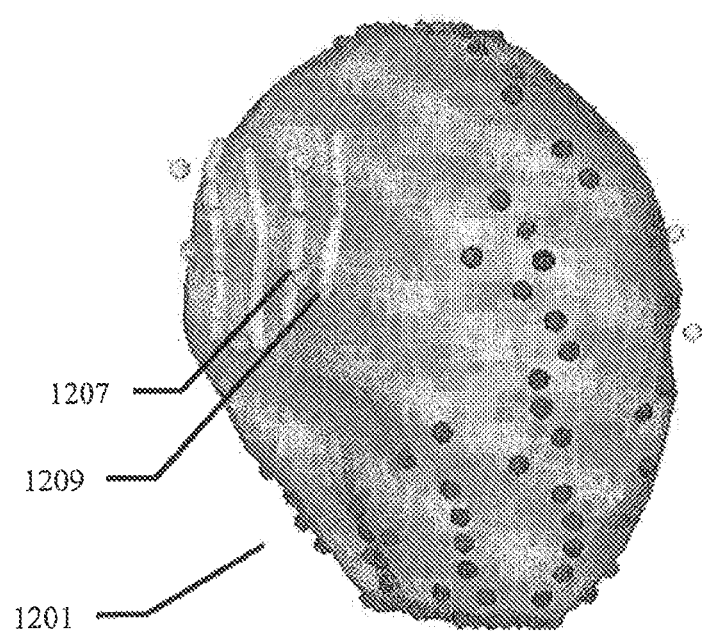

FIG. 12(A) shows surface projection points corresponding to six received edit contours including edit contours 1203 and 1205. FIG. 12(B) shows surface projection points corresponding to edit contours 1207 and 1209—these surface projection points are on the opposite side of the pre-existing surface 1201 from the surface projection points corresponding to edit contours 1203 and 1205. Surface projections points corresponding to edit contours 1207 and 1209 are shown in FIG. 12(C) which depicts an oblique perspective view of pre-existing surface 1201.

Figure 12D:
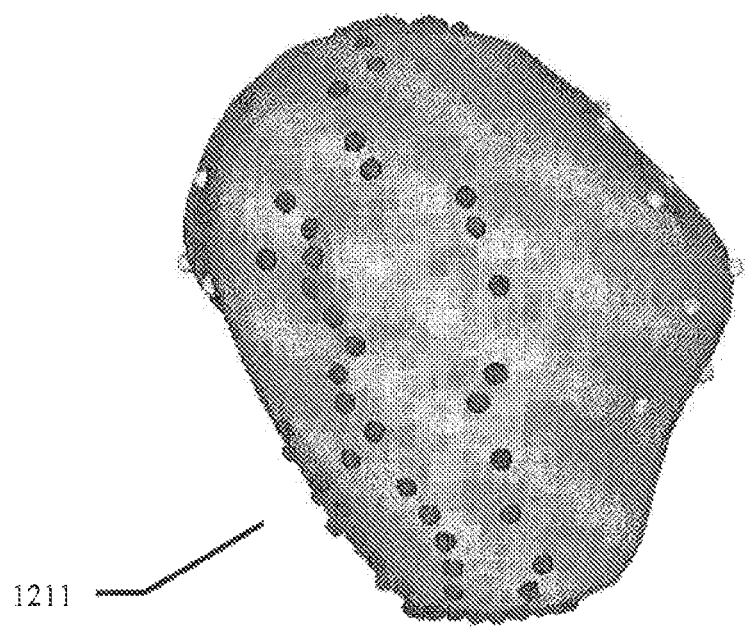

FIG. 12(D) depicts a new corrected surface 3211 generated after elimination of certain pre-existing constraint points. As can be seen, segmentation errors on both sides of the pre-existing surface 1201 have been corrected.

It should be noted that disjoint edit contours may correspond to any combination of different types of segmentation errors. For example, in the case of multiple disjoint edit contours, some edit contours may be designed to correct an over-segmentation while different edit contours are designed to correct an under-segmentation.

Figure 13A:
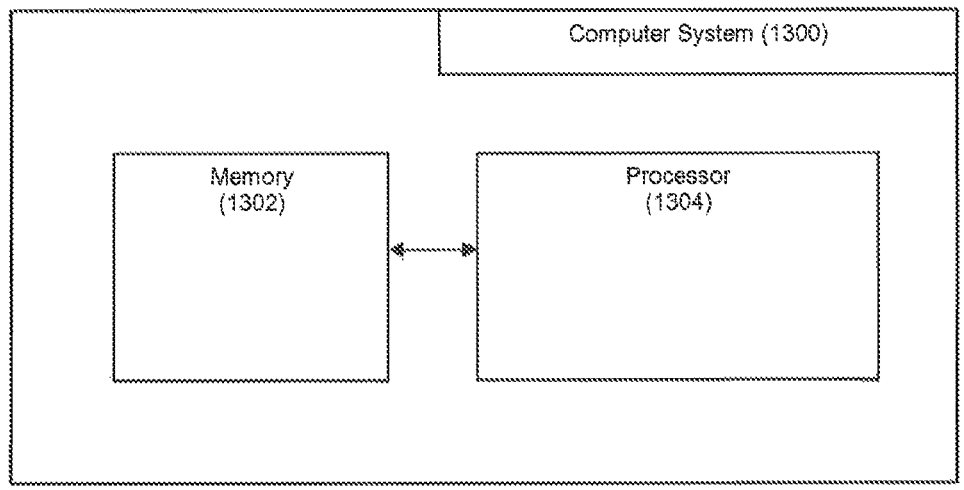
FIGS. 13(A)-13(B) depict computer systems according to exemplary embodiments.
Figure 13B:
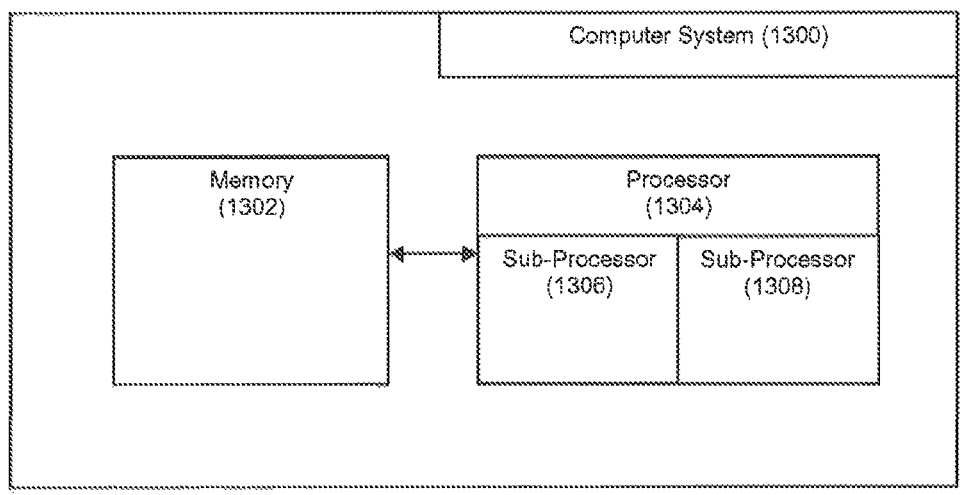

FIG. 13(a) depicts an exemplary processor 1304 and associated memory 1302 which can be configured to implement the error correction processes described herein in accordance with exemplary embodiments of the invention. The processor 1304 and associated memory 1302 may be deployed in a computer system 1300. Such a computer system 1300 can take any of a number of forms, including but not limited to one or more workstation computers, servers, imaging or treatment planning computers, scanners, smartphones, personal computers, laptop/notebook/tablet computers, personal digital assistants (PDAs), or combinations of the same. For example, an exemplary embodiment could be implemented as a cross-platform software application. Another exemplary embodiment could be implemented as a software application for a smartphone having an operating system such as Apple iOS™ or Android OS™. The processor 1304 may comprise a single processor or multiple processors, including multiple processors that are physically remote from each other as well as multiple sub-processors 1306 and 1308 within a processor 1304 (see FIG. 13(B); for example two CPU cores or separate CPUs, or a CPU and a math or graphics co-processor). Similarly, the memory 1302 can take the form of one or more physical memories. Moreover, the memory 1302 can be physically remote from processor 1300 if desired by a practitioner, such as a remote database of image data and/or program instructions accessible to the processor 1300 via a network such as the Internet. Examples of suitable memories for use as memory 1302 can be RAM memory, ROM memory, hard disk drive memory, etc.

The processor 1300 can be configured to execute one or more software programs. These software programs can take the form of a plurality of processor-executable instructions that are resident on a non-transitory computer-readable storage medium such as memory 1302. Processor 1304 is also preferably configured to execute an operating system such as Microsoft Windows™ or Linux™, as is known in the art. Furthermore, it should be understood that processor 1304 can be implemented as a special purpose processor that is configured for high performance with respect to computationally intensive mathematics, such as math or graphics co-processors.

Analysis of Results

FIGS. 15(A)-15(D) show analysis and comparison of various exemplary embodiments with varying parameters, based on a test sample of 103 imaged patients, with three structures imaged for each patient: prostate, bladder, and rectum.

Figure 15A:
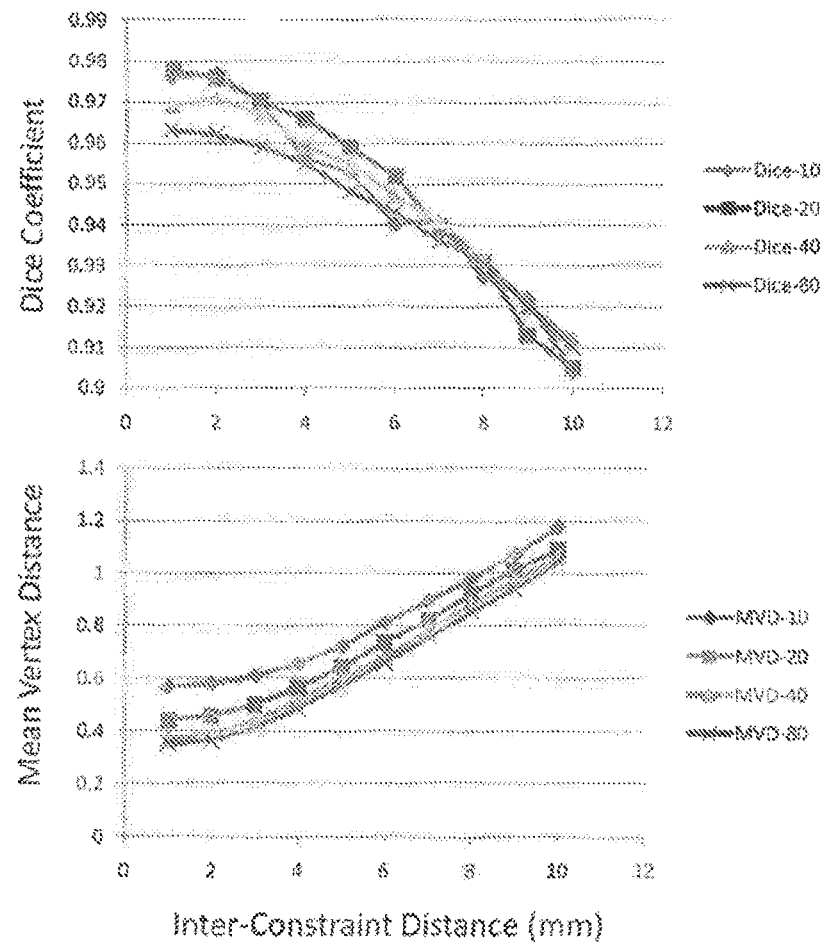
FIGS. 15(A)-15(D) depict graphs for analyzing the results of different embodiments.

FIG. 15(A) depicts a summary of results of automated reconstructions on a test sample of 103 prostates. The number and configuration of edit contours was held constant (8T8S8C). The number of constraints per contour was allowed to vary (10, 20, 40, 80) and the inter-constraint distance limit was varied from 1.0 to 10.0 mm in 1 mm increments. Thus, each of the 103 prostates was reconstructed 40 times (4 constraint per contour values multiplied by 10 distance thresholds), and each data point is the average overlap for 103 prostates at the given number of constraints per contour and the inter-constraint distance. Two overlap measures are reported: the Dice coefficient and the Mean vertex distance, described above. Plots of the mean vertex distances (MVD) show a couple of trends. First, the MVD shows that increasing the number of constraints per contour improves the surface agreement (lower average mean vertex distance), but the size of the increase declines rapidly after 20 constraints per contour. Second, for a given constraints per contour series, the MVD surface agreement degrades steadily from the 2.0 mm inter-constraint distance. The Dice overlap results are more difficult to interpret as the curves themselves overlap, though they clearly support the decline in surface agreement with increasing inter-constraint distance. The Dice coefficient and the mean vertex distances (MVD) both reveal that surface agreement declines with increasing inter-constraint distance and with fewer constraints per contour.

Figure 15B:
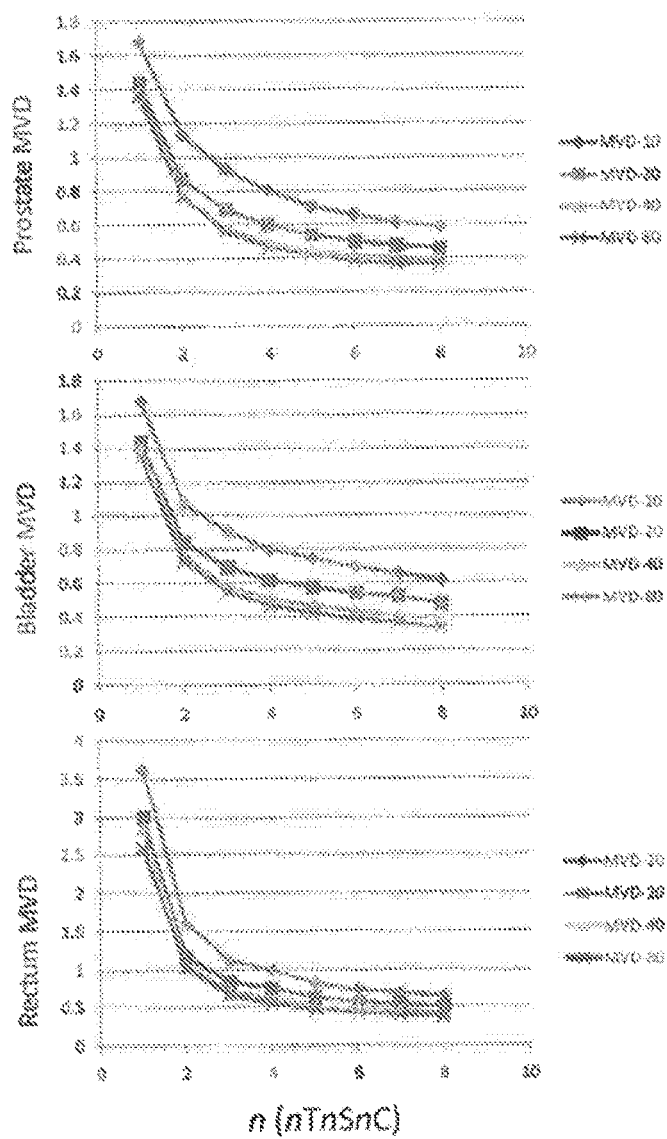

FIG. 15(B) summarizes a study of number of contours versus the number of constraints per contour for fixed inter-constraint limit of 2.0 mm. The surface agreement metric is the mean vertex distance (MVD) for the prostate, bladder and rectum expert structures, and each data point is the average overlap over 103 cases for the given number of constraints per contour and the number of contours. Some trends are apparent: 1) more contours leads to better surface agreement, but the rate of improvement declines rapidly after about 20 constraints per contour, and 2) within any of the constraints per contour series the overlap improves asymptotically, with the rate of improvement declining rapidly such that by n=3 or 4, most of the average improvement has been achieved. This is true for all three structures.

Figure 15C:
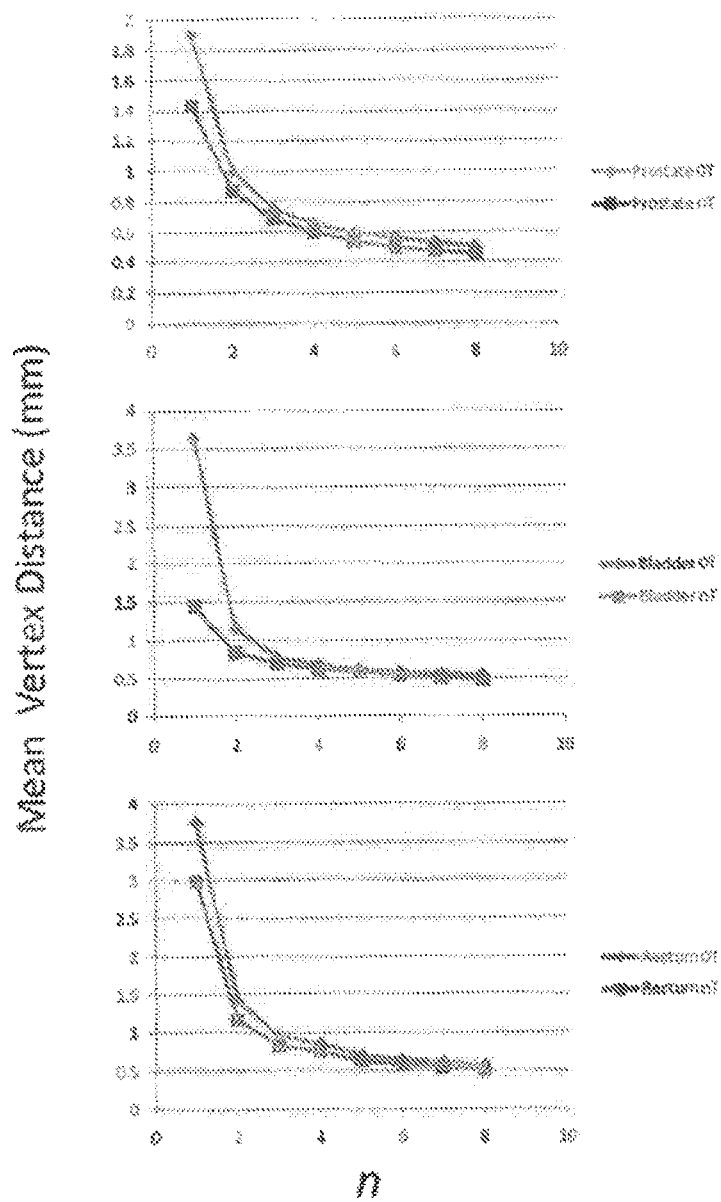

FIG. 15(C) depicts plots of the average mean vertex to closest vertex distance for reconstructions of bladder, prostate, and rectum with and without T contours. Structures1 have the nTnSnC contour sets, and Structures2 have the 0TnSnC set. As in the structure creation studies presented earlier, more user input can achieve greater overlap with the expert-drawn structure. Bladder1, Prostate1 and Rectum1 reconstruction studies used nTnSnC contours each, and the Bladder2, Prostate2, and Rectum2 studies used 0TnSnC. At low values of n the T contours contribute to more accurate overlap, but that advantage is gone by n=4. That means that reconstructions of these structures at least, may ignore the T views to achieve good overlap. This effect is undoubtedly due to the sampling bias enforced by tomographic reconstruction, where it is usual to reconstruct the T section to spatial resolution higher than the sampling rates in the other two dimensions.

Figure 15D:
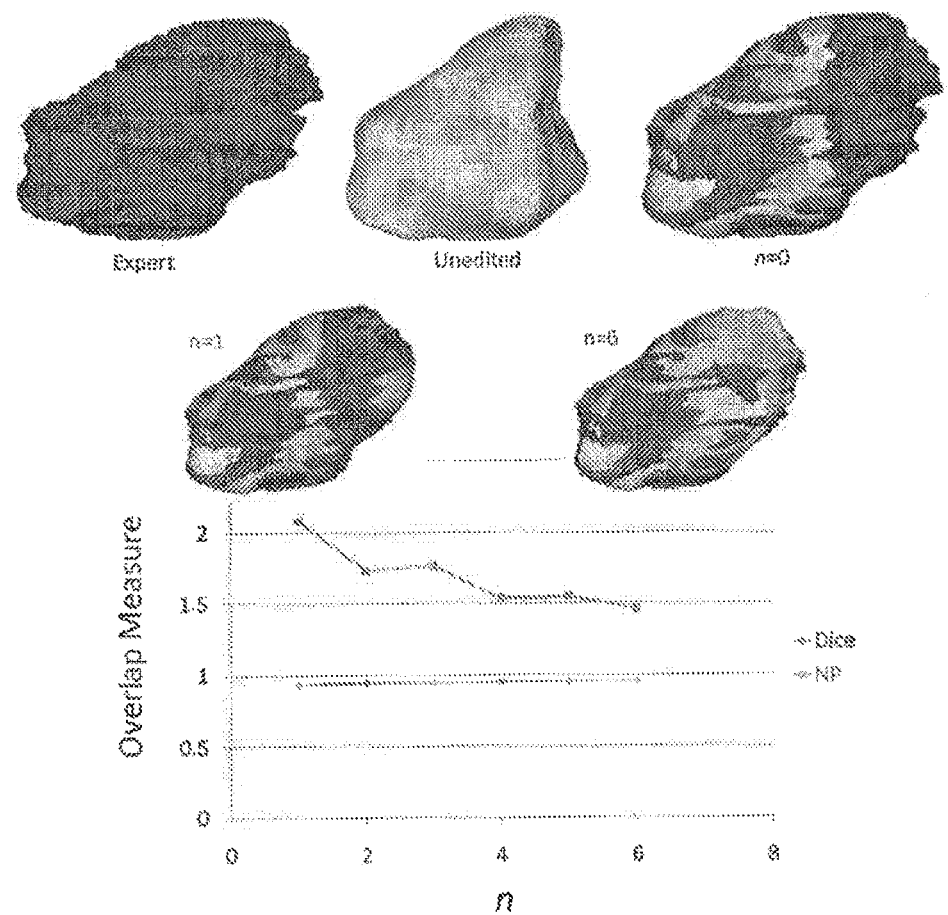

FIGS. 15(A)-(C) explored the reconstruction properties of implicit surfaces; FIG. 15(D) applies a similar analysis to implicit surface editing. FIG. 15(D) shows a demonstration of improved agreement of bladder of the previous figures with the expert structure using increasing numbers of user contours. The surfaces in the top row depict expert structure surface ("Expert"), the unedited surface produced by a prior segmentation ("Unedited"), and their superposition ("n=0"). FIG. 15(D) shows the results of comparing the user contours nTnS0C, n=1, . . . , 6 (no coronal contours used) with the available expert-contoured bladder. For this example, the overlap between the edited surface and the expert surface improves with more user input, to a point. Beyond four contours (4T4S0C), there is no substantial improvement in either the mean vertex distance (here, NP) or the Dice measure for this structure. These results were obtained for 20 constraints per contour and constraint distance of 2.0 mm. Reconstruction edits were performed by drawing edit-contours at the T and S planes spaced at intervals as in the reconstructions described above. The resulting modified surfaces were compared with the expert surface to give the results shown in the plot of Overlap Measures versus number of contours, n as in nTnS0C. Like the reconstructions from sections of the expert surface, increasing numbers of contours do produce improved overlap, up to about n=4, beyond which there is little further improvement.

REFERENCES

The full disclosure of each of the following references is incorporated herein by reference:

Bloomenthal, J, "An Implicit Surface Polygonizer," Graphics Gems IV, P Heckbert, Ed., Academic Press, New York, 1994.

Botsch, M, and Sorkine, O, "On linear variational surface deformation methods," IEEE Transactions on Visualization and Computer Graphics, 14(1), 213-230, 2008.

Carr, J C, Fright, R, and Beatson, R K, "Surface interpolation with radial basis functions for medical imaging," IEEE Transactions on Medical Imaging, 16, 96-107, 1997.

Carr, J C, Beatson, P K, Cherrie, J B, Mitchell, T J, Fright, W R, McCallum, B C, and Evans, T R, "Reconstruction and representation of 3D objects with radial basis functions," Proceedings of SIGGRAPH 01, pp 67-76, 2001.

de Berg, M, van Krefeld, M, Overmars, M, Schwartzkopf, O, Computational Geometry: Algorithms and Applications, Springer-Verlag, New York, 1997.

DeBoor, C, A Practical Guide to Splines, Springer, New York, 2001.

Cruz, L M V, and Velho, L, "A sketch on Sketch-based interfaces and modeling," Graphics, Patterns and images Tutorials, 23rd SIBGRAPI Conference, 2010, pp. 22-33.

Dinh, H Q, Turk, G, Slabaough, G, "Reconstructing surfaces by volumetric regularization using radial basis functions," IEEE Transactions on Pattern Analysis and Machine Intelligence, 24, 1358-1371, 2002.

Dinh, H Q, Yezzi, A, and Turk, G, "Texture transfer during shape transformation," ACM Transactions on Graphics, 24, 289-310, 2005.

Gelas, A, Valette, S, Prost, R, Nowinski, W L, "Variational implicit surface meshing," Computers and Graphics, 33, 312-320, 2009.

Gering D, Nabavi A, Kikinis R, Grimson W, Hata N, Everett P, Jolesz F, Wells W. An Integrated Visualization System for Surgical Planning and Guidance using Image Fusion and Interventional Imaging. Int Conf Med Image Comput Assist Interv. 1999; 2:809-819.

Golub G H and Van Loan, C F, Matrix Computations, The Johns Hopkins University Press, Baltimore, 1996.

Ho, S, Cody, H, Gerig, G, "SNAP: A Software Package for User-Guided Geodesic Snake Segmentation", Technical Report, UNC Chapel Hill, April 2003

Ibanez, L, Schroeder, Ng L, Cates, J, The ITK Software Guide, Second Edition, 2005.

Jackowski, J, and Goshtasby, A, "A computer-aided design system for refinement of segmentation errors," MICCAI 2005, LNCS 3750, 717-724, 2005.

Kalbe, T, Koch, T, and Goesese, "High-quality rendering of varying isosurfaces with cubic trivariate C1-continuous splines," ISVC 1, LNCS 5875, 596-607, 2009.

Karpenko, O, Hughes, J F, and Raskar, R, "Free-form sketching with variational implicit surfaces," Computer Graphics Forum, 21, 585-594, 2002.

Kaus, M R, Pekar, V, Lorenz, C, Truyen, R, Lobregt, S, and Weese, J, "Automated 3-d PDM construction from segmented images using deformable models," IEEE Transactions on Medical Imaging, 22(8), 1005-1013, 2003.

Kho, Y, and Garland, M, "Sketching mesh deformations," ACM Symposium on Interactive 3D Graphics and Games, 2005.

Knoll, A, Hijazi, Y, Kensler, A, Schott, M, Hansen, C, and Hagen, H, "Fast and robust ray tracing of general implicits on the GPU," Scientific Computing and Imaging Institute, University of Utah, Technical Report No. UUSCI-2007-014, 2007.

Leventon, M E, Grimson, W E L, Faugeras, O, "Statistical shape influence in geodesic active contours," IEEE Conference on Computer Vision and Pattern Recognition, 1316-1323, 2000.

Lorensen, W E, and Cline, H E, "Marching Cubes: A High Resolution 3D Surface Construction Algorithm," Computer Graphics; Proceedings of SIGGRAPH '87, 21, 163-169, 1987.

Nealen, A, Sorkine, O, Alexa, M, and Cohen-Or, D, "A sketch-based interface for detail-preserving mesh editing," Proceedings of ACM SIGGRAPH 2005, 24(3), 2005.

Pekar, V, McNutt, T R, Kaus, M R, "Automated model-based organ delineation for radio-therapy planning in prostatic region," Int. J. Radiation Oncology Biol. Phys., 60, (3), 973-980, 2004.

Pieper S, Lorensen B, Schroeder W, Kikinis R. The NA-MIC Kit: ITK, VTK, Pipelines, Grids and 3D Slicer as an Open Platform for the Medical Image Computing Community. Proceedings of the 3rd IEEE International Symposium on Biomedical Imaging: From Nano to Macro 2006; 1:698-701.

Pohl K M, Fisher, J, Grimson, W E L, Kikinis, B, Wells, W M, "A Bayesian model for joint segmentation and registration," NeuroImage, 31, 228-239, 2006.

Schroeder, W, Martin, K, and Lorensen, W, The Visualization Toolkit, 4th Ed., Kitware, 2006.

Singh, J M, and Narayanan, P J, "Real-time ray-tracing of implicit surfaces on the GPU," IEEE Transactions on Visualization and Computer Graphics, 99, 261-272, 2009.

Tsai, A, Yezzi, A Jr., Wells, W, Tempany, C, Tucker, D, Fan, A, Grimson, W E, Willsky, A, "A shape-based approach to the segmentation of medical imagery using level sets," IEEE Transactions on Medical Imaging, 22(2), 137-154, 2003.

Tsai, A, Wells, W M, Warfield, S K, Willsky, A S, "An EM algorithm for shape classification based on level sets," Medical image Analysis, 9, 491-502, 2005.

Turk, G and O'Brien, J F, "Shape Transformation Using Variational Implicit Functions," in Proceedings of SIGGRAPH 99, Annual Conference Series, (Los Angeles, Calif.), pp. 335-342, August 1999.

Wahba, G, Spline Models for Observational Data, SIAM (Society for Industrial and Ap-plied Mathematics), Philadelphia, Pa., 1990.

Yushkevich, P A, Piven, J, Cody Hazlett, H, Gimpel Smith, R., Ho, S, Gee, J J, Gerig, G, "User-Guided 3D Active Contour Segmentation of Anatomical Structures: Significantly Improved Efficiency and Reliability," NeuroImage 31, 1116-1128, 2006.

It should be noted again that embodiments described above may be useful beyond the field of medical imaging, in any field where there is a need for correcting segmentation errors in images, such as cellular imaging or other fields.

While the present invention has been described above in relation to its preferred embodiments including the preferred equations discussed herein, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. A computer-implemented method for reducing segmentation error in a three-dimensional (3D) representation of an object utilizing a processor configured to execute computer-executable instructions to perform the computer-implemented method comprising:
applying at least one of (1) a surface point projection test, and (2) a surface patch test to a plurality of constraint points defining a 3D surface representative of the object;
identifying one or more of the plurality of constraint points for elimination based on at least one of the applied surface point projection test or the applied surface patch test; and
generating the 3D representation of the object using a subset of the plurality of constraint points, wherein the subset does not include the one or more constraint points identified for elimination.

2. The computer-implemented method of claim 1, comprising applying both the surface point projection test and the surface patch test to the plurality of constraint points.

3. The computer-implemented method of claim 1, comprising applying the surface point projection test and not the surface patch test to the plurality of constraint points.

4. The computer-implemented method of claim 1, comprising applying the surface patch test and not the surface point projection test to the plurality of constraint points.

5. The computer-implemented method of claim 1, wherein the surface point projection test further includes generating surface projection points based on projections of contours onto a pre-existing surface.

6. The computer-implemented method of claim 5, wherein the surface point projection test further includes using the surface projection points to identify the one or more constraints points for elimination.

7. The computer-implemented method of claim 6, wherein the surface point projection test further includes applying a proximity threshold test to identify which of the plurality of constraint points are in a zone of elimination.

8. The computer-implemented method of claim 1, wherein the surface patch test further includes identifying end points for each of a plurality of edit contours and ordering the end points to form a continuous, non-self-intersecting polygon and define a surface patch.

9. The computer-implemented method of claim 8, wherein the surface patch test further includes applying a proximity threshold test to identify which of the plurality of constraint points are in a zone of elimination around the surface patch.

10. An apparatus for reducing segmentation error in a three-dimensional (3D) representation of an object, the apparatus comprising:
at least one memory device storing computer-executable instructions; and
a processor configured to execute the stored instructions to:
apply at least one of (i) a surface point projection test, and (ii) a surface patch test to a plurality of constraint points defining a 3D surface representative of the object;
identify one or more of the plurality of the constraint points for elimination based on at least one of the applied surface point projection test or the applied surface patch test; and
generate the 3D representation of the object using a subset of the plurality of constraint points, wherein the subset does not include the one or more constraint points identified for elimination.

11. The apparatus of claim 10, wherein the processor is configured to apply both the surface point projection test and the surface patch test to the plurality of constraint points.

12. The apparatus of claim 11, wherein the processor comprises a first subprocessor configured to apply the surface projection point test and a second sub-processor configured to apply the surface patch test, and wherein the processor is configured to apply the surface projection point test and the surface patch test in parallel using the first and second sub-processors.

13. The apparatus of claim 10, wherein the processor is configured to apply the surface point projection test and not the surface patch test to the plurality of constraint points.

14. The apparatus of claim 10, wherein the processor is configured to apply the surface patch test and not the surface point projection test to the plurality of constraint points.

15. A non-transitory, tangible, computer-readable medium storing instructions executable by at least one processor to reduce segmentation error in a three-dimensional (3D) representation of an object according to a method, the method comprising:
applying at least one of (i) a surface point projection test, and (ii) a surface patch test to a plurality of constraint points defining a 3D surface representative of an object;
identifying one or more of the plurality of the constraint points for elimination based on at least one of the applied surface point projection test or the applied surface patch test; and
generating the 3D representation of the object using a subset of the plurality of constraint points, wherein the subset does not include the one or more constraint points identified for elimination.

16. The non-transitory computer-readable medium of claim 15, wherein the method further includes applying both the surface point projection test and the surface patch test to the plurality of constraint points.

17. The non-transitory computer-readable medium of claim 15, wherein the method further includes applying the surface point projection test and not the surface patch test to the plurality of constraint points.

18. The non-transitory computer-readable medium of claim 15, wherein the method further includes applying the surface patch test and not the surface point projection test to the plurality of constraint points.

19. The non-transitory computer-readable medium of claim 15, wherein the surface point projection test further includes generating surface projection points based on projections of contours onto a pre-existing surface.

20. The non-transitory computer-readable medium of claim 19, wherein the surface point projection test further includes using the surface projection points to identify the one or more constraints points for elimination.

* * * * *

UNITED STATES PATENT AND TRADEMARK OFFICE
CERTIFICATE OF CORRECTION

PATENT NO.       : 9,367,958 B2
APPLICATION NO.  : 14/489547
DATED            : June 14, 2016
INVENTOR(S)      : Lyndon S. Hibbard It is certified that error appears in the above-identified patent and that said Letters Patent is hereby corrected as shown below:

Claims

In claim 6, column 21, lines 36-37,
"constraints points" should read --constraint points--.

In claim 20, column 22, line 59,
"constraints points" should read --constraint points--.

Signed and Sealed this
Twenty-third Day of August, 2016

Michelle K. Lee
*Director of the United States Patent and Trademark Office*